(12) United States Patent
Kraft et al.

(10) Patent No.: US 12,459,001 B2
(45) Date of Patent: Nov. 4, 2025

(54) ULTRASONIC TRANSDUCER ARRAY DEVICE

(71) Applicant: KATHOLIEKE UNIVERSITEIT LEUVEN, Leuven (BE)

(72) Inventors: Michael Kraft, Raeren (DE); Robert Puers, Blanden (BE); Sina Sadeghpour Shamsabadi, Lubbeek (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 313 days.

(21) Appl. No.: 18/037,159

(22) PCT Filed: Nov. 19, 2021

(86) PCT No.: PCT/EP2021/082335
§ 371 (c)(1),
(2) Date: May 16, 2023

(87) PCT Pub. No.: WO2022/106637
PCT Pub. Date: May 27, 2022

(65) Prior Publication Data
US 2024/0024916 A1    Jan. 25, 2024

(30) Foreign Application Priority Data

Nov. 19, 2020 (EP) .................... 20208666
Nov. 19, 2020 (EP) .................... 20208670
Nov. 19, 2020 (EP) .................... 20208676

(51) Int. Cl.
*B06B 1/02* (2006.01)
*B06B 1/06* (2006.01)

(52) U.S. Cl.
CPC .......... *B06B 1/0292* (2013.01); *B06B 1/0666* (2013.01)

(58) Field of Classification Search
CPC ... B06B 1/0292; B06B 1/0666; B06B 1/0622; B06B 1/0207; B06B 1/0607;
(Continued)

(56) References Cited

U.S. PATENT DOCUMENTS

| 8,710,717 B2 | 4/2014 | Dausch |
| 9,067,779 B1 | 6/2015 | Rothberg et al. |

(Continued)

FOREIGN PATENT DOCUMENTS

| CN | 102933318 A | 2/2013 |
| CN | 106660074 A | 5/2017 |

(Continued)

OTHER PUBLICATIONS

Christiansen et al., "Acoustical Cross-Talk in Row-Column Addressed 2-D Transducer Arrays for Ultrasound Imaging", Ultrasonics, vol. 63, Jul. 21, 2015, pp. 174-178.
(Continued)

*Primary Examiner* — Daniel L Murphy
*Assistant Examiner* — Amie M Ndure
(74) *Attorney, Agent, or Firm* — Workman Nydegger

(57) ABSTRACT

An ultrasonic transducer multilayer structure, including: a semiconductor layer stack defining a diode, a micro-machined ultrasonic transducer, MUT, layer stack being electrically in series with said diode and comprising a first electrically conductive layer disposed at least partly on the diode, a cavity extending over a region comprising at least a portion of the semiconductor layer stack and the first electrically conductive layer, wherein the MUT layer stack comprises a membrane extending at least partly over said region. The ultrasonic transducer multilayer structure may be used in a sensor apparatus for measuring at least one characteristic of an object. The sensor apparatus is used for medical imaging, such as cardiac imaging, obstetrics, gyne-
(Continued)

cology, abdominal imaging, intravascular imaging, and mammography, or non-destructive testing (NDA), fingerprint sensors, range finders, gesture recognition, ultrasonic haptic feedback, ultrasonic communication or MEMs speakers.

13 Claims, 22 Drawing Sheets

(58) Field of Classification Search
CPC ...... H10N 39/00; H10N 30/071; G10K 9/122; H01L 27/20; H01L 27/1214; H01L 41/311; H01L 41/1132; G06K 9/0002; G06F 3/0436; G01S 7/52028
See application file for complete search history.

(56) References Cited

U.S. PATENT DOCUMENTS

| | | | |
|---|---|---|---|
| 10,576,500 | B2 | 3/2020 | Foncellino et al. |
| 2009/0080292 | A1 | 3/2009 | Wagner et al. |
| 2014/0219063 | A1 | 8/2014 | Hajati et al. |
| 2016/0107194 | A1* | 4/2016 | Panchawagh ......... B06B 1/0644 310/317 |
| 2017/0110504 | A1* | 4/2017 | Panchawagh ......... G06F 3/0436 |
| 2017/0352797 | A1* | 12/2017 | Crowder .............. H10N 30/302 |
| 2018/0107854 | A1 | 4/2018 | Tsai et al. |
| 2019/0316958 | A1 | 10/2019 | Akkaraju et al. |
| 2019/0336099 | A1 | 11/2019 | Fife et al. |

FOREIGN PATENT DOCUMENTS

| | | | | |
|---|---|---|---|---|
| CN | 108246593 | A | 7/2018 | |
| EP | 3530358 | A1 | 8/2019 | |
| EP | 3788798 | B1 * | 7/2023 | .............. A61B 8/12 |
| EP | 3708263 | B1 * | 8/2023 | ........... B06B 1/0207 |
| WO | 2009004558 | A2 | 1/2009 | |
| WO | 2015086413 | A1 | 6/2015 | |
| WO | 2016007250 | A1 | 1/2016 | |
| WO | WO-2016061410 | A1 * | 4/2016 | ........... B06B 1/0207 |
| WO | 2017065691 | A1 | 4/2017 | |
| WO | WO-2017066612 | A1 * | 4/2017 | ........... B06B 1/0207 |
| WO | 2018039085 | A1 | 3/2018 | |

OTHER PUBLICATIONS

Fard et al., "Evaluating Pressure Ulcer Development in Wheelchair-Bound Population Using Sitting Posture Identification", Engineering, vol. 5, No. 10, Oct. 1, 2013, pp. 132-136.
Hu et al., "Crosstalk Suppression for Piezoresistive Tactile Sensor Arrays with a Large Resistance Measurement Range", Sensors and Measuring Systems, Proceedings of the 19th ITG/GMA-Symposium, Jun. 26-27, 2018, pp. 46-50.
Medrano-Sanchez et al., "Circuit Analysis of Matrix-Like Resistor Networks for Eliminating Crosstalk in Pressure Sensitive Mats", IEEE Sensors Journal, vol. 19, No. 18, Sep. 15, 2019, pp. 8027-8036.
Extended European Search Report from corresponding European Patent Application No. 20208676.5, May 21, 2021.
Extended European Search Report from corresponding European Patent Application No. 20208666.6, May 31, 2021.
Extended European Search Report from corresponding European Patent Application No. 20208670.8, May 28, 2021.
International Search Report from corresponding PCT Application No. PCT/EP2021/082335, Mar. 2, 2022.
Chinese Office Action from Corresponding Chinese Patent Application No. CN202180078122.0, Jun. 23, 2025.

* cited by examiner

ULTRASONIC TRANSDUCER ARRAY DEVICE

FIELD OF THE INVENTION

The present invention is generally related to the field of ultrasonic transducers, and in particular to an ultrasonic transducer array device configured to transmit and receive ultrasonic signals, and to methods for fabrication of such.

BACKGROUND OF THE INVENTION

Ultrasound imaging, in particular 3D ultrasound imaging, is a powerful means of imaging and is particularly useful in applications such as sonar, gesture recognition, finger print sensors, medical imaging and non-destructive testing (NDT). One way of acquiring a 3D image is to use a 2-dimensional array of ultrasonic transducers, which eliminates the need for a mechanical motor or manual movement of a one-dimensional array of transducers.

One of the main difficulties in fabricating a 2D array of transducers is the wiring to access the individual transducers. The individual transducers in a 2D array can be accessed by bonding or integrating a full diced piezoelectric transducer or capacitive transducer matrix directly with front-end electronics, for example on top of a CMOS chip (i.e. CMOS integration). In this way, each piezoelectric or capacitive element has access to its own front-end and can be controlled individually. This requires the size of the CMOS chip to be the same as that of the transducer array device matrix, which makes the entire device extremely expensive, which is a barrier to making very large 2D arrays. Moreover, this technology cannot be used in flexible ultrasound transducers, such as those fabricated on flexible substrates, like a silicone elastomer.

For high resolution imaging applications, micro-machined ultrasound transducers (MUT) can be used. Micromachined ultrasonic transducer (MUT) technology is based on semiconductor materials and lithography techniques, and are becoming the main alternative to bulk PZT-based transducers in different applications. MUTs have a relatively simple fabrication process and can be miniaturized for a better image resolution.

In general, MUTs operate in two different mechanisms: capacitive force (referred to as "capacitive MUT" or "cMUT") or piezoelectric (also referred to as "piezoelectric MUT" or "pMUT") sensing-actuation. Hence, cMUT and pMUT are the commonly used types of MUTs.

CMUT is based on two parallel membranes with a very small vacuum gap (around 200 nm) in between the membranes. The upper membrane is attracted to the bottom membrane by an electrostatic force which is induced by an applied voltage across the membranes. CMUTs have a number of limitations, among which the requirement of a high DC bias voltage, which is a particular disadvantage in applications wherein the transducer is part of a handheld device; failure or drift in performance, due to the accumulated charge during the required high voltage operation; and difficulty with generating a sufficiently high acoustic pressure.

A pMUT includes a thin membrane, which vibrates due to an applied force generated by a thin piezoelectric layer. The piezoelectric layer is deposited on top of the membrane and is driven by an electric signal. PMUTs suffer from a low bandwidth, and low output pressure due to a low electromechanical coupling factor, which are two important factors for ultrasound imaging in both medical and NDT applications, among others. The low bandwidth results in difficulty achieving the short pulse response required for high spatial resolution. The low output pressure results in a low amplitude of the emitted ultrasound, which can cause a low signal-to-noise ratio. There is therefore still a need for ultrasonic transducers which can be easily miniaturised and have a sufficiently high output pressure and bandwidth.

MUTs have, in comparison with conventional transducers, a simpler and cheaper fabrication process. Moreover, MUTs can be miniaturized for a better image resolution. For example, for small size matrices, e.g. a 16×16 matrix arrangement of MUTs, individual wire-bonding is still possible in order to have access to all transducers in the matrix individually. Wire-bonding is a cheap process, which allows the CMOS chip to be designed and fabricated independent form the dimension of the matrix. However, for larger matrices the MUT technology, for both cMUT and pMUT, has the same problem as the conventional technology in making 2D arrays. Due to the density of the elements in the transducer matrix, addressing by wire-bonded contacts becomes very difficult.

"Acoustical cross-talk in row-column addressed 2-D transducer arrays for ultrasound imaging" (T. Christiansen et al., Ultrasonics, Vol. 63, December 2015, pp. 174-178) describes a row-column addressing arrangement for reducing the number of contacts needed in a 2D array of cMUTs. This reduces the number of electrical contacts needed for an n×n array of transducers from $n^2$ to $2n$.

However, row-column addressing in arrays of MUTs suffers from cross-coupling: when a particular transducer is addressed by applying a signal to a row-column pair, the signal can be capacitively coupled into adjacent rows and columns, therefore causing other transducers to be activated when this is not desired. Thus, row-column addressing alone is an inefficient solution for 2D arrays of MUT arrays.

In addition to the need for ultrasonic transducers which can be easily miniaturised and have a sufficiently high output pressure and bandwidth, there is thus still a need in the art for ultrasonic transducers and associated arrays which address at least some of the issues outlined above.

SUMMARY OF THE INVENTION

It is an object of embodiments of the present invention to provide for an ultrasonic transducer array or ultrasonic transducer array devices which allow individual addressing of transducers, in particular MUTs, while minimizing the number of electronic contacts and reducing crosscoupling between neighbouring electrodes. This object is accomplished by an ultrasonic transducer array device and an ultrasonic transducer multilayer structure according to the present invention.

It is an advantage of embodiments of the present invention that there is no need for state-of-the-art front-end electronics, for example a CMOS chip, to access the individual ultrasonic transducers with an array configuration, which allows providing relatively cheap devices in comparison with front-end electronics comprising ultrasonic array devices.

It is a further advantage of embodiments of the present invention that the use of first electrodes for connecting ultrasonic transducers along a first direction in the array configuration and second electrodes for connection ultrasonic transducers along a second direction in the array configuration, significantly reduces the number of electric contacts needed.

It is a further advantage of embodiments of the present invention that for at least one ultrasonic transducer in the array configuration the first electrode is connected to the second electrode via a diode in series with the respective ultrasonic transducer reducing the capacitive cross-coupling between electrodes.

It is a further advantage of embodiments of the present invention that the manufacturing process of the ultrasonic transducer multilayer structure and related array devices in the array configuration may be simple and cheap due to the use of inexpensive off-the-shelf components and the no need of expensive front-end electronics for accessing the ultrasonic transducers individually.

It is another advantage of embodiments of the invention is that the cavity is capable of supporting standing waves which allows tailoring of the bandwidth of the emitted ultrasonic waves. The bandwidth can be increased due to the frequencies of the cavity combining with the frequency of the membrane, thus providing a transducer with multiple resonance frequencies and therefore a broader bandwidth than a transducer which does not comprise a cavity capable of supporting standing waves.

It is a further advantage of embodiments of the invention that the at least one acoustically suitable medium in the cavity can help to damp vibration of the membrane, which helps to prevent ringing without requiring damping layer(s) to be provided on the membrane.

In one aspect, the invention relates to an ultrasonic transducer array device configured to transmit and receive ultrasonic signals, comprising: a plurality of ultrasonic transducers arranged in an array configuration; at least one first electrode for connecting the ultrasonic transducers along a first direction in the array configuration; at least one second electrode for connecting the ultrasonic transducers along a second direction in the array configuration; wherein at least one first electrode is connected to at least one second electrode via a diode in series with a respective ultrasonic transducer, wherein, when in use, a direction from an anode to a cathode of the diode coincides with a direction from a high potential side to a low potential side of the respective ultrasonic transducer, and wherein the low potential side of the respective ultrasonic transducer is connected with the anode of the diode.

In some embodiments the array configuration is an m-n row-column configuration of m rows and n columns, wherein m and n are positive integers having a sum equal to or larger than three, and wherein the first direction corresponds with a direction along a row m, and wherein the second direction corresponds with a direction along a column n.

Each first electrode may be connected to each second electrode via a diode in series with a respective ultrasonic transducer, wherein when in use, a direction from an anode to a cathode of the diode coincides with a direction from a high potential side to a low potential side of the respective ultrasonic transducer, and wherein the low potential side of the respective ultrasonic transducer is connected with the anode of the diode.

Preferably the plurality of ultrasonic transducers comprises at least one micro-machined ultrasonic transducer (MUT), wherein the at least on MUT is a piezoelectric micro-machined ultrasonic transducer (pMUT) or a capacitive micro-machined ultrasonic transducer (cMUT).

Advantageously, the diode and the respective ultrasonic transducer in series with the diode are provided by a multilayer structure as described below.

It is an object of the present invention to provide for an ultrasonic transducer multilayer structure for ultrasonic transducer array devices which allow individual addressing of transducers, in particular MUTs, while minimizing the number of electronic contacts and reducing cross-coupling between neighbouring electrodes. This object is accomplished by an ultrasonic transducer multilayer structure according to the present invention.

In one aspect, the invention relates to an ultrasonic transducer multilayer structure comprising: a semiconductor layer stack defining a diode; a micro-machined ultrasonic transducer (MUT) layer stack being electrically in series with the diode and comprising a first electrically conductive layer, e.g. a metal layer, the MUT layer stack disposed at least partly on the diode; a cavity extending over a region comprising at least a portion of the semiconductor layer stack and the first electrically conductive layer, wherein the MUT layer stack comprises a membrane extending at least partly over the region.

In another aspect, the invention relates to a method of manufacturing an ultrasonic multilayer structure or an ultrasonic transducer array device according to any embodiment of the previous aspects, comprising the steps of: providing a first wafer according to an array configuration, wherein the first wafer defines a semiconductor layer stack, said semiconductor layer stack defining a diode; providing a second wafer, preferably a silicon-based wafer comprising a SiO2 layer or a silicon nitride layer; bonding the first wafer to the second wafer, defining a silicon-on-insulator (SOI) wafer wherein the second wafer defines a buried oxide (BOX) layer of the SOI wafer; processing the first wafer to a predetermined thickness of an ultrasonic transducer array device, fabricating a MUT layer stack on the diode, said MUT layer stack comprising a first electrically conductive layer; creating a cavity extending over a region comprising at least a portion of said semiconductor layer stack and said first electrically conductive layer.

The invention also relates to a use of an ultrasonic transducer array device according to any embodiment of the first aspect in a sensor apparatus for measuring at least one characteristic of an object, wherein the sensor apparatus is used for medical imaging, such as cardiac imaging, obstetrics, gynaecology, abdominal imaging, intravascular imaging, and mammography, or non-destructive testing (NDA), fingerprint sensors, range finders, gesture recognition, ultrasonic haptic feedback, ultrasonic communication or MEMs speakers.

It is also an object of the present invention to provide for ultrasonic transducers which can easily be miniaturised and have sufficiently high output pressure and bandwidth. The object is accomplished by providing a micro-machined ultrasonic transducer comprising a cavity and an acoustically coupled membrane having a constructive interference to provide an additional driving force for the vibration of the membrane resulting in an increase of the amplitude of the vibrations compared to situations where constructive interference does not occur.

It is another advantage of embodiments of the invention is that the cavity is capable of supporting standing waves which allows tailoring of the bandwidth of the emitted ultrasonic waves. The bandwidth can be increased due to the frequencies of the cavity combining with the frequency of the membrane, thus providing a transducer with multiple resonance frequencies and therefore a broader bandwidth than a transducer which does not comprise a cavity capable of supporting standing waves.

It is a further advantage of embodiments of the invention that the at least one acoustically suitable medium in the cavity can help to damp vibration of the membrane, which helps to prevent ringing without requiring damping layer(s) to be provided on the membrane.

In an aspect, the invention relates to a micro-machined ultrasonic transducer comprising an ultrasound source comprising: at least one vibratable membrane having a membrane thickness defined along a first direction, and at least one means for causing or detecting a vibration of the at least one vibratable membrane in order to emit or to receive ultrasonic waves; a cavity capable of supporting standing ultrasonic waves and defined by a first end, a second end and a side wall, wherein the first end is opposed to the second end along the first direction, and wherein the side wall is extending between the first end and the second end; and wherein the at least one vibratable membrane is acoustically coupled to the cavity and closes the first end of the cavity.

In one embodiment the micro-machined ultrasonic transducer comprises an end wall disposed at the second end of the cavity, wherein the end wall has an end wall thickness defined along the first direction. The end wall thickness may be substantially greater than the thickness of the at least one membrane. In other embodiments the end wall thickness is substantially smaller than the thickness of the at least one membrane.

In another embodiment the side wall has an acoustic impedance which is less than an acoustic impedance of the end wall.

Advantageously, the micro-machined ultrasonic transducer further comprises a first micro-channel and possibly a second micro-channel through the end wall.

In some embodiments the cavity has a cross-sectional dimension which is substantially the same as a cross-sectional dimension of the at least one vibratable membrane.

In a further embodiment the at least one vibratable membrane comprises at least two adjacent vibratable membranes and at least two corresponding means for causing or detecting a vibration of the corresponding vibratable membrane in order to emit or to receive ultrasonic waves.

In one embodiment the ultrasound source has a near field distance and the cavity has a cavity length less than the near field distance.

Preferably the cavity comprises at least one acoustically suitable medium adapted to support standing waves and at least partly connected to the at least one vibratable membrane, wherein the acoustically suitable medium is a gas, solid, or liquid medium, including air, helium, silicone oil, castor oil, gel, polyurethane, polyester, epoxy resin, foamed plastics, foamed metal, soft rubber, silicone rubber, sound absorption rubber, butyl rubber, glass wool, glass fibre, felt, silk, cloth and micro-perforated panel.

In preferred embodiments the ultrasound source and the cavity are defined by a multilayer structure as described.

In another aspect, the invention relates to an ultrasonic transducer array device configured to transmit and receive ultrasonic signals, comprising: a plurality of micro-machined ultrasonic transducers according to at least one embodiment of the first aspect of the invention arranged in an array configuration; at least one first electrode for connecting the micro-machined ultrasonic transducers along a first direction in the array configuration; at least one second electrode for connecting the micro-machined ultrasonic transducers along a second direction in the array configuration; wherein at least one first electrode is connected to at least one second electrode via a diode in series with a respective micro-machined ultrasonic transducer, wherein, when in use, a direction from an anode to a cathode of the diode coincides with a direction from a high potential side to a low potential side of the respective micro-machined ultrasonic transducer, and wherein the low potential side of the respective micro-machined ultrasonic transducer is connected with the anode of the diode.

In a further aspect, the invention relates to a use of a micro-machined ultrasonic transducer as previously mentioned or an ultrasonic transducer array device as previously mentioned, wherein such use comprises placing the at least one membrane in contact with a liquid or gel as a transmission medium for ultrasonic waves generated by the micro-machined ultrasonic transducer or micro-machined ultrasonic transducer array.

In yet another aspect, the invention relates to a method of fabricating a micro-machined ultrasonic transducer as described above, comprising the steps of providing a wafer, forming a cavity in the back side of the wafer, and sealing the second end of the cavity.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
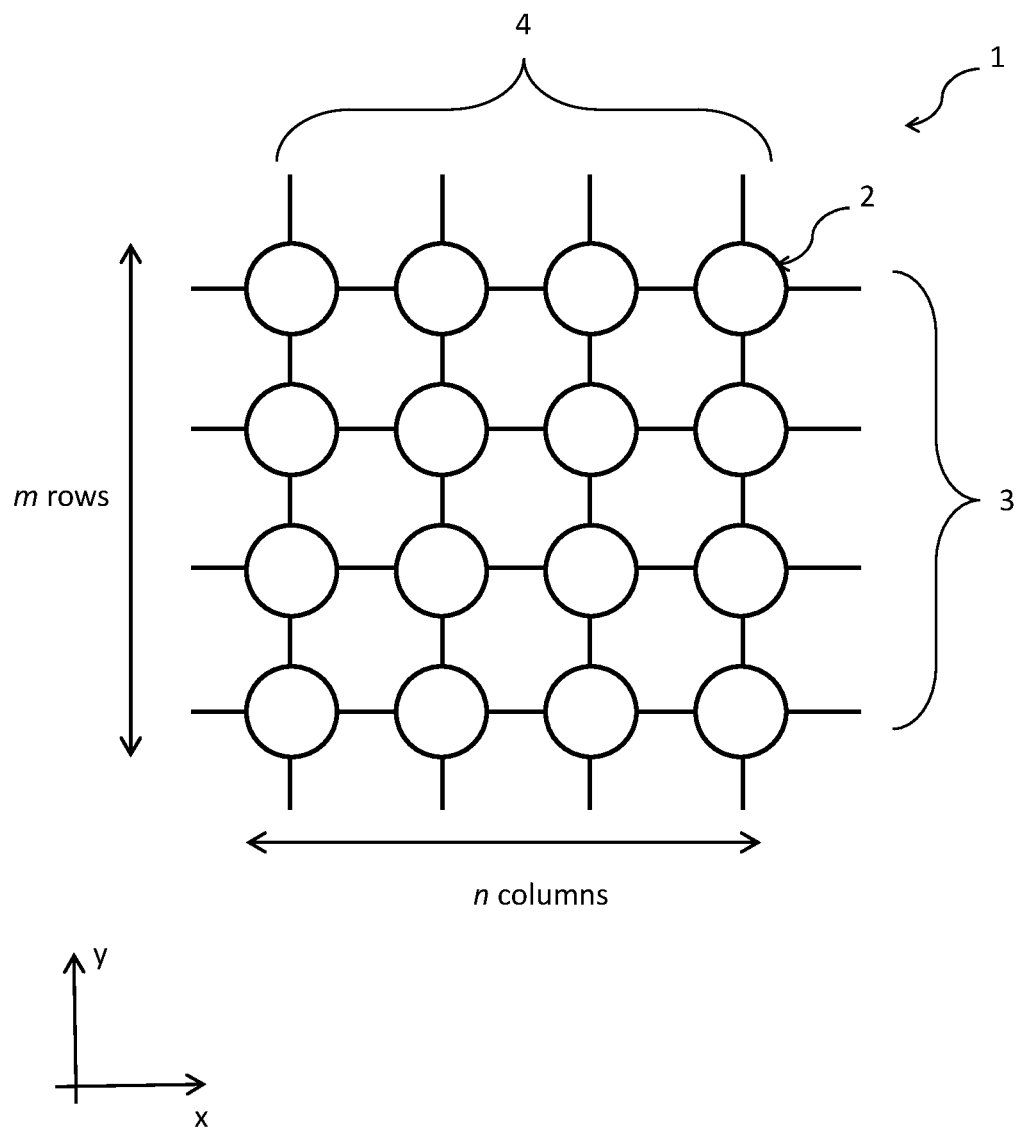
FIG. 1 illustrates a schematic view of an ultrasonic transducer array device according to embodiments of the present invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Referring to FIG. 1, an ultrasonic transducer array device 1, hereinafter also referred to as transducer array device 1, according to embodiments of the present invention is shown. The configuration as depicted in FIG. 1 corresponds with an array configuration of m rows and n columns located in a supporting surface, according to embodiments of the present invention. This supporting surface may be substantially flat or convex. Other array configuration may also be possible, like for example, a linear array, a symmetrical matrix formed array, an asymmetrical matrix formed array, a curved array, or an annular array, or a combination thereof, without being limited thereto.

The transducer array device 1 comprises a plurality of ultrasonic transducers 2 (indicated in FIGS. 1, 2, 3a and 3b by a capacitor symbol) arranged in an array configuration, for example an array configuration of m rows and n columns. Each individual transducer $2_{mn}$ within this configuration can be uniquely identified by its row m and column n location.

The transducer array device 1 comprises at least one first electrode 3 for connecting ultrasonic transducers 2 along a first direction, and at least one second electrode 4 for connecting ultrasonic transducers 2 along a second direction.

For example, in an array configuration of m rows and n columns, the first electrode 3 may correspond with a row electrodes $3_m$ and the second electrode 4 may correspond with a column electrode $4_n$. Each row electrode $3_m$ electrically connects ultrasonic transducers $2_{mn}$ along row $_m$. Each column electrode $4_n$ electrically connects ultrasonic transducers $2_{mn}$ along column n.

Figure 2:
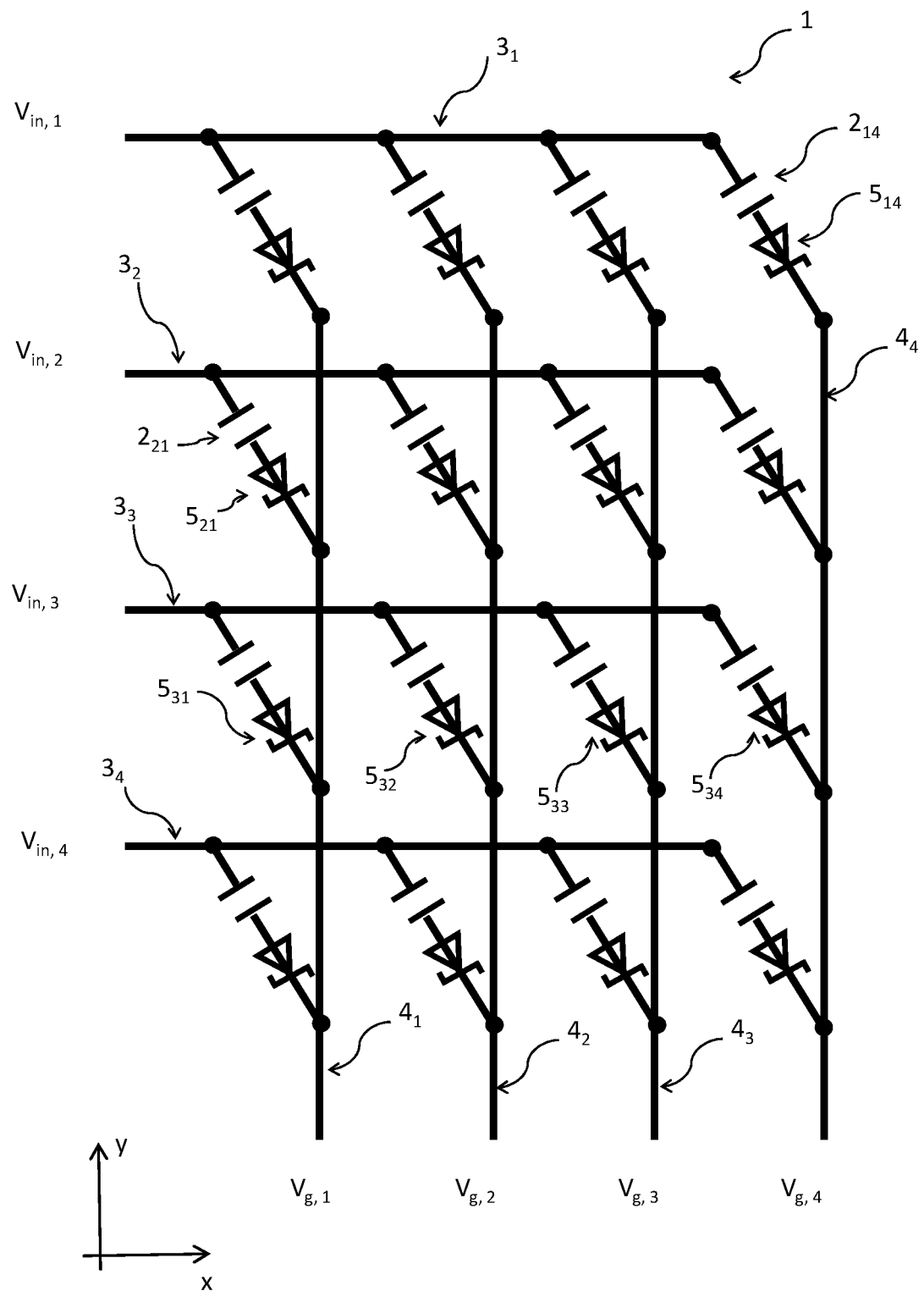
FIG. 2 depicts a simplified schematic electrical model of an ultrasonic transducer array device according to embodiments of the present invention, wherein each ultrasonic transducer of the array device is in series with a respective diode.

For example, for the arrangement shown in FIG. 2, the row electrodes $3_m$ connect, when in use, the anodes of the ultrasonic transducer $2_{mn}$ and the column electrodes $4_n$ connect the cathodes of the ultrasonic transducers $2_{mn}$, wherein the high potential side of the ultrasonic transducers $2_{mn}$ is connected with the row electrodes $3_m$ and the low potential side of the ultrasonic transducers $2_{mn}$ is connected with the column electrodes $4_n$.

Each ultrasonic transducer $2_{mn}$ in FIG. 2 is connected in series with a respective diode $5_{mn}$, wherein the respective first or row electrode $3_m$ is connected to a respective second or column electrode $4_n$ via the respective diode $5_{mn}$ in series with the respective ultrasonic transducer $2_{mn}$, wherein, when in use, a direction from an anode to a cathode of the respective diode $5_{mn}$ coincides with a direction from a high potential side to a low potential side of the respective ultrasonic transducer $2_{mn}$, and wherein the low potential side of the respective ultrasonic transducer $2_{mn}$ is connected with the anode of the respective diode $5_{mn}$. The first or row electrodes $3_m$ may instead connect cathodes of the ultrasonic transducers $2_{mn}$ and the second or column electrodes $4_n$ may connect anodes of the ultrasonic transducers $2_{mn}$, provided that the diode directions as shown in FIG. 2 are reversed.

By connecting the ultrasonic transducers $2_{mn}$ in such a m-n row-column manner, the number of electrical connections (m+n) required in order to achieve individual addressing of each ultrasonic transducer $2_{mn}$ is greatly reduced as compared to an arrangement wherein each ultrasonic transducer $2_{mn}$ requires a unique, individual (e.g. wire-bonded) electrical contact (m×n connections required).

According to embodiments of the present invention, each first or row electrode $3_m$ is connected to each second or column electrode $4_n$ via a respective diode $5_{mn}$. Thus, for example, in an ultrasonic transducer array 1 comprising four first or row electrodes $3_1$, $3_2$, $3_3$, $3_4$, and four second or column electrodes $4_1$, $4_2$, $4_3$, $4_4$, as shown in FIG. 2, the row electrode $3_3$ is connected to the column electrode $4_1$ via diode $5_{31}$. The same row electrode $3_3$ is connected to the column electrode $4_2$ via diode $5_{32}$. The same row electrode $3_3$ is connected to the column electrode $4_3$ via diode $5_{33}$, and is connected to the column electrode $4_4$ via diode $5_{34}$. However, it will be understood that the present invention is not limited to four (4) first or row electrodes $3_m$ and four (4) second or column electrodes $4_n$, and other numbers of row electrodes and column electrodes are possible.

Each first or row electrode $3_m$ has a voltage input $V_{in, m}$ at a first end of the row electrode $3_m$. Each second or column electrode $4_n$ has a voltage output $V_{g, n}$ at a second end of the column electrode $4_n$. The diodes $5_{mn}$ are arranged so as to allow current to flow from the first end $V_{in, m}$ of a row electrode $3_m$ to the second end $V_{g, n}$ of a column electrode $4_n$ through the diode $5_{mn}$ and through the corresponding transducer $2_{mn}$, provided that an appropriate voltage difference is established between the first end $V_{in, m}$ and the second end $V_{g, n}$. In other words, when an ultrasonic transducer array device according to embodiments of the present invention is in use, a direction from an anode to a cathode of the diode $5_{mn}$ coincides with a direction from a high potential side to a low potential side of the respective ultrasonic transducer $2_{mn}$, and wherein the low potential side of the respective ultrasonic transducer $2_{mn}$ is connected with the anode of the diode $5_{mn}$.

For example, when a voltage is applied to the first end $V_{in, 2}$ of the first or row electrode 32 such that a positive voltage difference exists between the first end $V_{in, 2}$ of the first or row electrode $3_2$ and the second end $V_{g, 1}$ of the second or column electrode $4_1$, current will flow between the first end $V_{in, 2}$ and the second end $V_{g, 1}$ via the diode $5_{21}$ and via the transducer $2_{21}$.

Hence, it is an advantage of an ultrasonic transducer array device 1 according to embodiments of the present invention that by integrating diodes $5_{mn}$ according to embodiments of the present invention, activation of untargeted ultrasonic transducers $2_{mn}$ by capacitive coupling can be avoided.

Figure 3A:
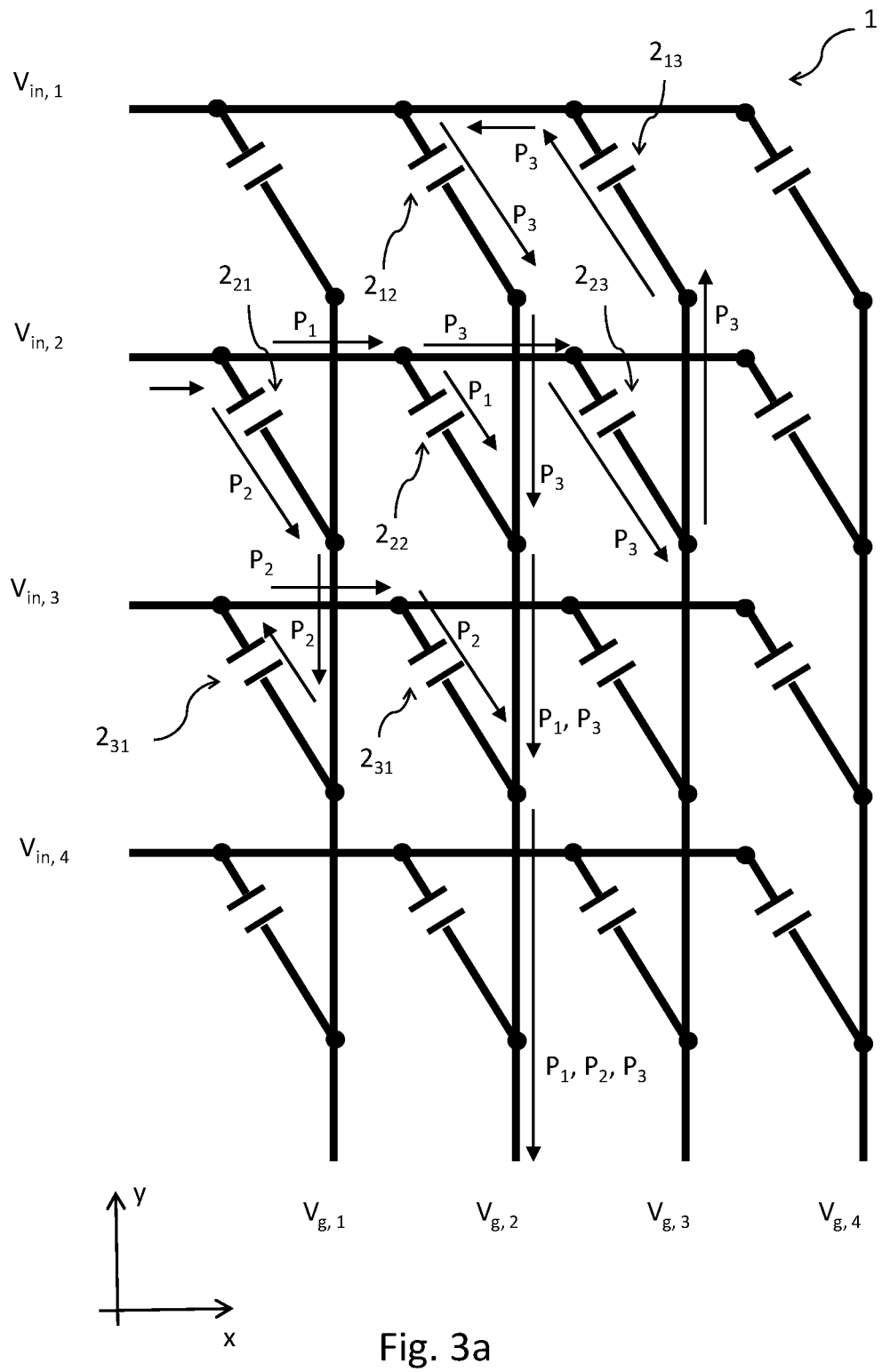
FIG. 3a illustrates a simplified schematic electrical model of an ultrasonic transducer array device which does not include the diodes according to embodiments of the present invention.

For example, referring to FIG. 3a, a transducer array device 1 according to embodiments of the present invention is shown. This transducer array device 1 does not include the diodes $5_{mn}$ like presented in FIG. 2. In order to activate ultrasonic transducer $2_{22}$ a voltage is applied to the first end $V_{in,2}$ of the first or row electrode $3_2$ such that a voltage difference exists between the first end $V_{in,2}$ of the first or row electrode $3_2$ and the second end $V_{g,2}$ of the second or column electrode $4_2$. This causes current to flow along a first path P1 along the first or row electrode $3_2$ through the transducer $2_{22}$ and then through the second or column electrode $4_2$ to its second end $V_{g,2}$. However, due to capacitive coupling, current is also induced to flow along a second path P2 which activates, in order, ultrasonic transducers $2_{21}$, $2_{31}$, and $2_{32}$. Additionally, current is induced to flow along a third path P3 which activates, in order, ultrasonic transducers $2_{22}$, $2_{13}$, and $2_{12}$.

Figure 3B:
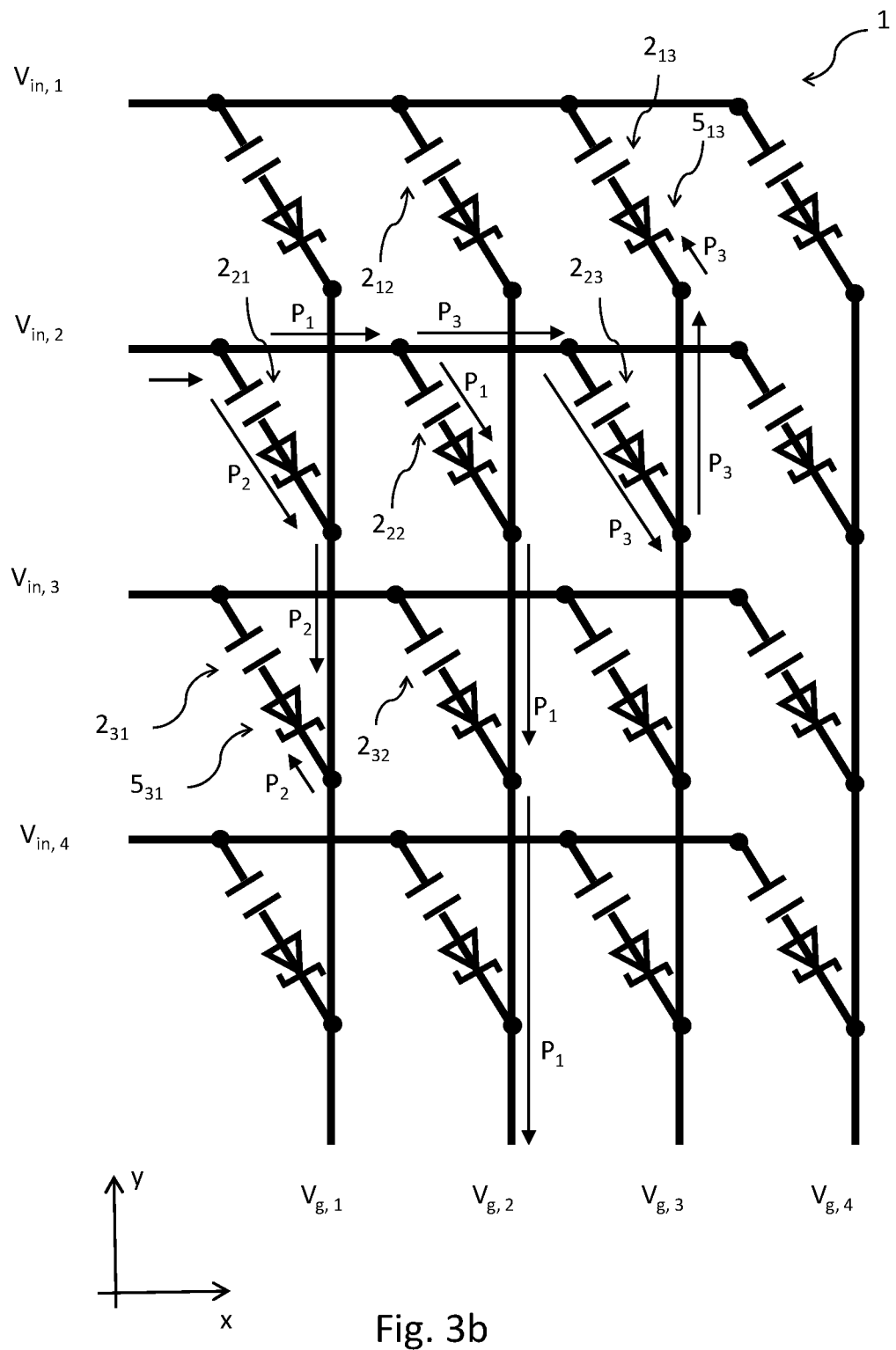
FIG. 3b is a simplified schematic electrical model of an ultrasonic transducer array device according to embodiments of the present invention.

Referring to FIG. 3b, in a transducer array device 1 according to embodiments of the present invention, the second path P2 is terminated by diode $5_{31}$ and so there is no closed circuit and current cannot flow through transducers $2_{31}$ leaving it inactivated. The third path P3 is terminated by diode $5_{13}$ and so there is no closed circuit and current cannot flow through ultrasonic transducers $2_{13}$, and $2_{23}$, leaving them inactivated. The first path P1 is unchanged. Thus, only the desired transducer $2_{22}$ is activated.

Although the preceding embodiments according to the present invention are described with or without reference to an ultrasonic transducer array device 1 wherein each ultrasonic transducer $2_{mn}$ has or has not a corresponding diode $5_{mn}$, embodiments of the present invention also encompass an array configuration wherein not every ultrasonic transducer $2_{mn}$ has a corresponding diode $5_{mn}$. The advantages as described herein are still present in an ultrasonic transducer array device 1 wherein at least one diode $5_{mn}$ in series with a respective ultrasonic transducer $2_{mn}$ is provided as, for example, diode $5_{31}$ in FIG. 3b can still prevent activation of three (3) ultrasonic transducers while ultrasonic transducer $2_{22}$ is targeted. Thus even an ultrasonic transducer array device 1 of multiple ultrasonic transducers $2_{mn}$ comprising only one diode $5_{mn}$ in series with one of the respective ultrasonic transducers $2_{mn}$ can still provide an improvement in the selectivity of addressing of ultrasonic transducers $2_{mn}$ in the array configuration.

According to embodiments of the present invention, the plurality of ultrasonic transducers $2_{mn}$ (hereinafter also referred to with reference number 2) comprises at least one micro-machined ultrasonic transducer (also referred to as "MUT"), wherein the at least one MUT is a piezoelectric micro-machined ultrasonic transducer (also referred to as "pMUT") or a capacitive micro-machined ultrasonic transducer (also referred to as "cMUT").

According to embodiments of the present invention, the ultrasonic transducer 2 and respective diode 5. (hereinafter also referred to with reference number 5) in series is provided as a multilayer structure. For example, a diode 5 may be provided at least in part by a semiconductor layer stack and an electrically conductive layer disposed over the semiconductor layer stack so as to form a Schottky diode or a p-n diode, depending on the dopant conductivity type and concentration of the semiconductor layer in direct contact with the electrically conductive layer.

The electrically conductive layer, e.g. metal layer, and the semiconductor layer are part of the same multilayer structure as the ultrasonic transducer 2, wherein the ultrasonic transducer 2 may be defined by a MUT layer stack disposed at least partly on the diode.

Figure 4A:
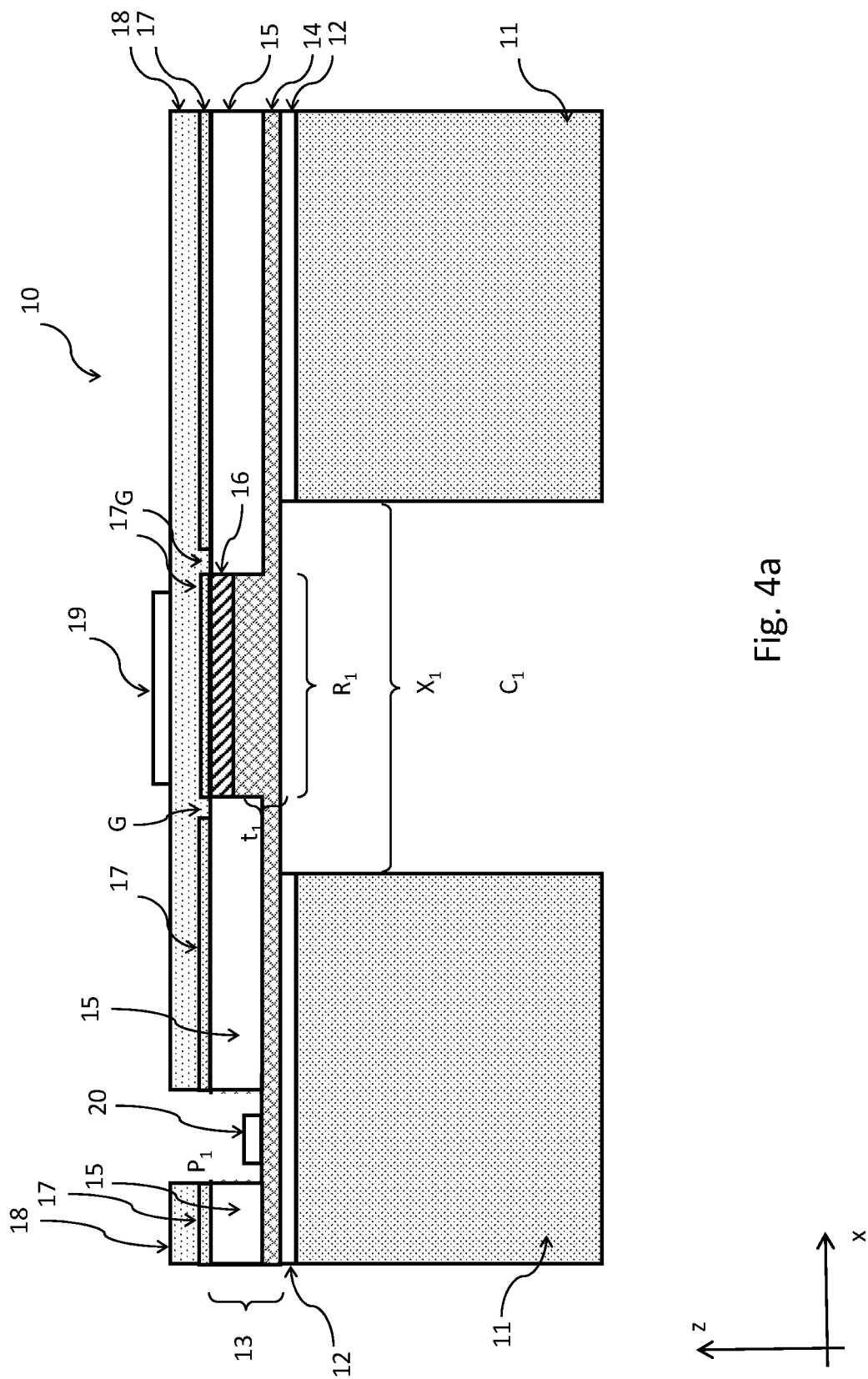
FIG. 4a is a schematic cross-sectional side view of a multilayer structure illustrating a diode in series with the respective ultrasonic transducer according to embodiments of the present invention, wherein the multilayer structure comprises a pMUT layer stack.

Referring to FIG. 4a, a schematic cross-sectional side view of a first multilayer structure 10 defined by a diode in series with a respective ultrasonic transducer according to embodiments of the present is illustrated. The first multilayer structure 10 comprises a substrate structure comprising a substrate 11 and an insulating layer 12. The substrate 11 may be a silicon substrate. The insulating layer 12 may be a silicon dioxide layer disposed over the substrate 11. A semiconductor layer stack 13, defining a diode 5, may be disposed over the substrate structure 11, 12. In some embodiments of the present invention, the silicon dioxide layer 12 may be replaced with a silicon nitride layer. Preferably, the silicon substrate 11 and silicon dioxide layer 12 are formed from a silicon-on-insulator ("SOI") wafer preferably having a (111) device layer crystal orientation. In some embodiments of the present invention, there can be no insulating layer.

The semiconductor layer stack 13, defining the diode 5 according to embodiments described above, comprises a first semiconductor layer 14 which is disposed over and in contact with the insulating layer 12, preferably made out of a silicon dioxide layer. The first semiconductor layer 14 is heavily doped with a dopant of a first conductivity type. According to embodiments of the present invention, the first semiconductor layer 14 is heavily n-doped. The first semiconductor layer 14 has a first thickness $t_1$, measured in the z-direction in a first central region R1 of the first multilayer structure 10, and a second thickness $t_2$, smaller than the first thickness t1, elsewhere. The first central region R1 is measured in the x-direction.

A second layer 15 may be disposed over the first semiconductor layer 14 outside the first region R1, i.e. at locations in the x-y plane where the thickness of the first semiconductor layer 14 is $t_2$. The second layer 15 may be a semiconductor layer substrate doped with a dopant of the first conductivity type. Substrate doped means that it has a very low doping (or no doping) concentration which is about $10^2$ to $10^3$ times less than the doping concentration of the third semiconductor layer 16 (see below). According to other embodiments layer 15 is an isolation layer, for example a polymer layer.

The semiconductor layer stack 13 comprises a third semiconductor layer 16 which is disposed over the first semiconductor layer 14 in the first central region R1, i.e. at locations in the x-y plane where the thickness of the first semiconductor layer 14 is $t_1$. The third semiconductor layer 16 of the semiconductor layer stack 13 is weakly doped with a dopant of the first conductivity type. According to embodiments of the present invention, the third semiconductor layer 16 is n-doped and has a thickness preferably between 100 nanometres (nm) and 500 nanometres (nm).

The first multilayer structure 10 further comprises a first electrically conductive layer 17 preferably comprising platinum, but other materials may be used such as aluminium, molybdenum, chromium, gold, and/or silver.

The first electrically conductive layer 17 may be at least partly disposed over the third semiconductor layer 16 and the second semiconductor layer 15 of the semiconductor layer stack 13, wherein the first electrically conductive layer 17 defines electrically conductive layer gaps G, also referred to as gaps G, such that the part of the first electrically conductive layer 17 disposed over the third semiconductor layer 16 is not connected to the part of the first electrically conductive layer 17 disposed over the second semiconductor layer 15. In other words, a first portion of the first electrically conductive layer 17 is sandwiched between the third semiconductor layer 16 and at least a portion of a piezoelectric layer 18 over the first central region R1 within the first region $X_1$, and a second portion of the first electrically conductive layer is 17 disposed on at least a part of the second semiconductor layer 15 such that the first portion and the second portion of the first electrically conductive layer 17 define the first electrically conductive layer gap G.

According to embodiments of the present invention, the piezoelectric layer 18 may be, for example, of lead zirconate titanate (PZT), aluminum nitride (AlN), scandium-doped aluminium nitride (Sc—AlN), PMN (chemical formula: Pb(Mg1/3Nb2/3)O3), PZN (chemical formula: Pb(Zn1/3Nb2/3)O3), PMN-PT, PZT-PMN, ZnO, ZnO2, or any other piezoelectric material that can be fabricated as a thin film.

The piezoelectric layer 18 may be disposed over the electrically conductive layer 17 and may fill the first electrically conductive layer gap or gaps G. The first multilayer structure 10 may further comprise a top electrode 19 disposed on the piezoelectric layer 18. This top electrode 19 may be a first or a second electrode as previously described in embodiments of the present invention. The first multilayer structure 10 further comprises a recess P1 which may extend through the piezoelectric layer 18, the electrically conductive layer 17, and the second semiconductor layer 15. A second electrode 20 may be provided in the recess P1 on the first semiconductor layer 14.

According to embodiments of the present invention, a multilayer structure 10 may comprise the layers and features as described above related to FIG. 4a, wherein the layers on top of the semiconductor layer stack 13 may have more than one piezoelectric layer and corresponding electrodes, plus some insulating and protecting layer in between the piezoelectric and/or electrically conductive layer and/or on top of the whole device. Insulating layers can be polymers such as polyimide or ceramics, such as Al2O3, SiO2 or SiN, or a combination thereof without being limited thereto.

A Schottky junction is formed at the interface between the electrically conductive layer 17 and a doped, preferably low doped, semiconductor layer. When reference is made to this interface, reference is made to metal/n– doped interface or anode. The other side is referred to as metal/n+ doped interface or cathode.

A cavity C1 is provided through the silicon substrate 11 and the silicon dioxide layer 12, such that a first portion of the first multilayer structure comprising the semiconductor layer stack 13, the electrically conductive layer 17, and the piezoelectric layer 18 is suspended over or overlying the cavity C1 over a first region, wherein the first region $X_1$ extends in the x-direction over a distance substantially corresponding with the width of the cavity C1 measured in the x-direction. Note the cavity is also extended in the y-direction, which is not shown in the figure.

This first portion extending over the first region $X_1$ defines an ultrasound source comprising at least one membrane and at least one means for causing the at least one membrane to vibrate so as to receive and emit ultrasonic waves. The at least one membrane, extending over the region first $X_1$, may comprise a first portion of the semiconductor layer stack 13 and the electrically conductive layer 17, whereas the means for causing the membrane to vibrate may comprise a portion of the piezoelectric layer 18. Hence, the means for causing the membrane to vibrate may comprise, for example, a layer of piezoelectric material for forming a piezoelectric MUT ("pMUT") or a multilayer structure together with a vacuum cavity for forming a capacitive MUT ("cMUT"). Each MUT can transmit and receive acoustic waves. Acoustic waves are generated when a voltage difference is applied across a first electrode and a second electrode in contact with the means for causing the membrane to vibrate. Conversely, arriving or detected acoustic waves creates motion in the MUT, producing an electric signal detected by the means.

The first multilayer structure 10 along with the electrodes 19 and 20, provide an ultrasonic transducer 2. However, as will be described in more detail hereinafter, in some embodiments the ultrasonic transducer 2 is a cMUT defining a different cavity than the cavity C1 illustrated in FIG. 4a.

The piezoelectric layer 18 is capable of expanding and contracting upon application of a voltage difference between the high and low potential electrodes 19, 20. This causes vibration of the suspended portion over the first region $X_1$ of the piezoelectric layer 18 and the electrically conductive layer 17 and semiconductor layer stack 13 in the z-direction (being perpendicular to the plane of the multilayer structure 10), which causes ultrasound waves to be emitted. Conversely, arriving or detected acoustic waves create motion of the at least one membrane in the pMUT, producing an electric signal detected by the electrodes 19,20.

The first electrode 19, for example high potential electrode, can be connected to, or form part of, a row electrode 3 of an ultrasonic transducer array device 1 as described hereinbefore. The second electrode 20, for example low potential electrode, can be connected to, or form part of, a column electrode 4 of an ultrasonic transducer array device 1 as described hereinbefore.

Figure 4B:
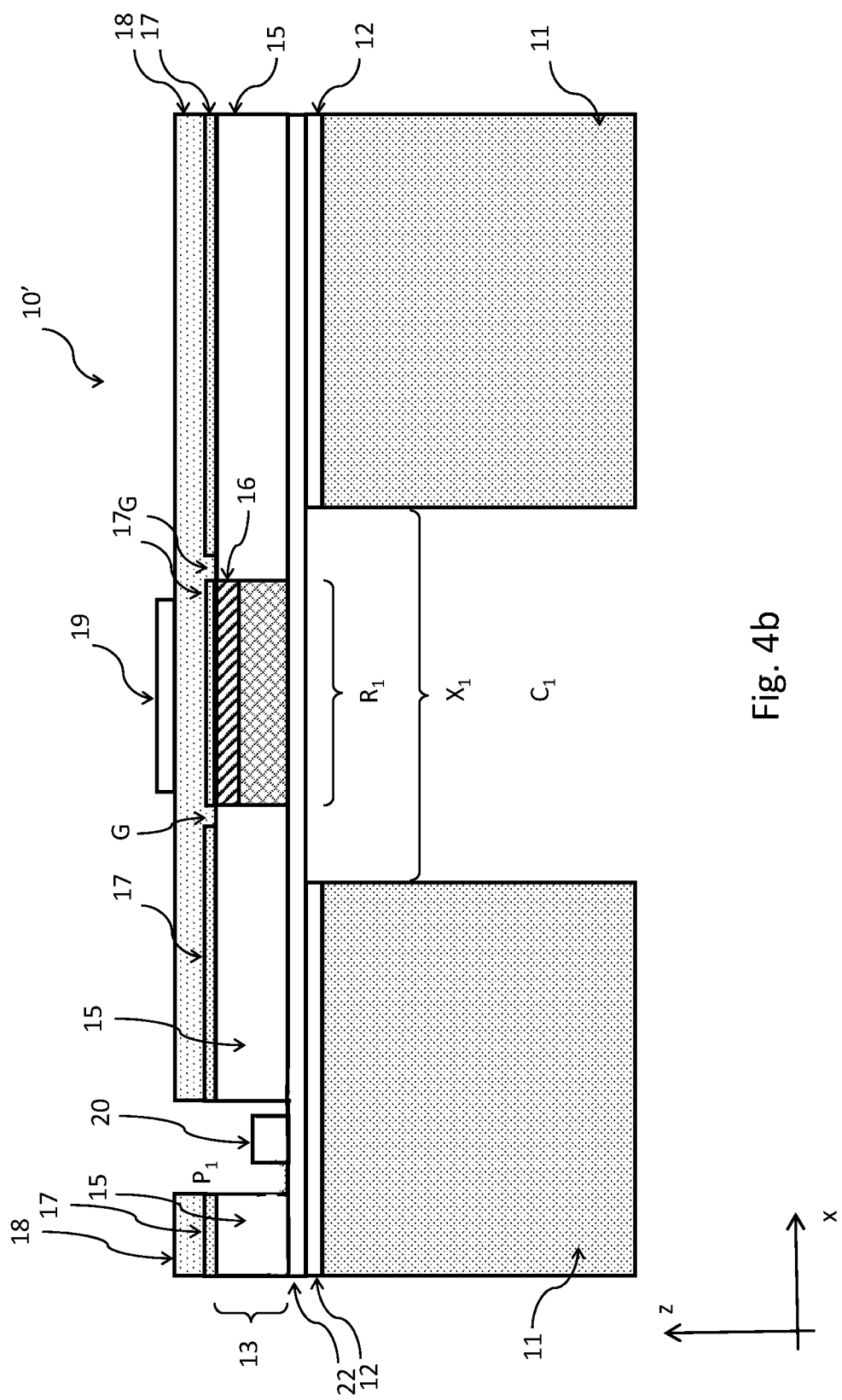
FIG. 4b is a schematic cross-sectional side view of a multilayer structure illustrating a diode in series with the respective ultrasonic transducer according to embodiments of the present invention, wherein the multilayer structure comprises a pMUT layer stack

Referring to FIG. 4b, a modified first multilayer structure 10' is the same as the first multilayer structure 10 of FIG. 4a except that the modified first multilayer structure 10' also comprises a metal layer 22, to reduce the resistivity of the ground conductor, between the semiconductor layer stack 13 and the insulating layer 12, wherein the insulating layer 12 may be a silicon dioxide (SiO2) layer 12. Embodiments as shown in FIG. 4a and FIG. 4b may have a protective isolation layer on top.

Figure 5:
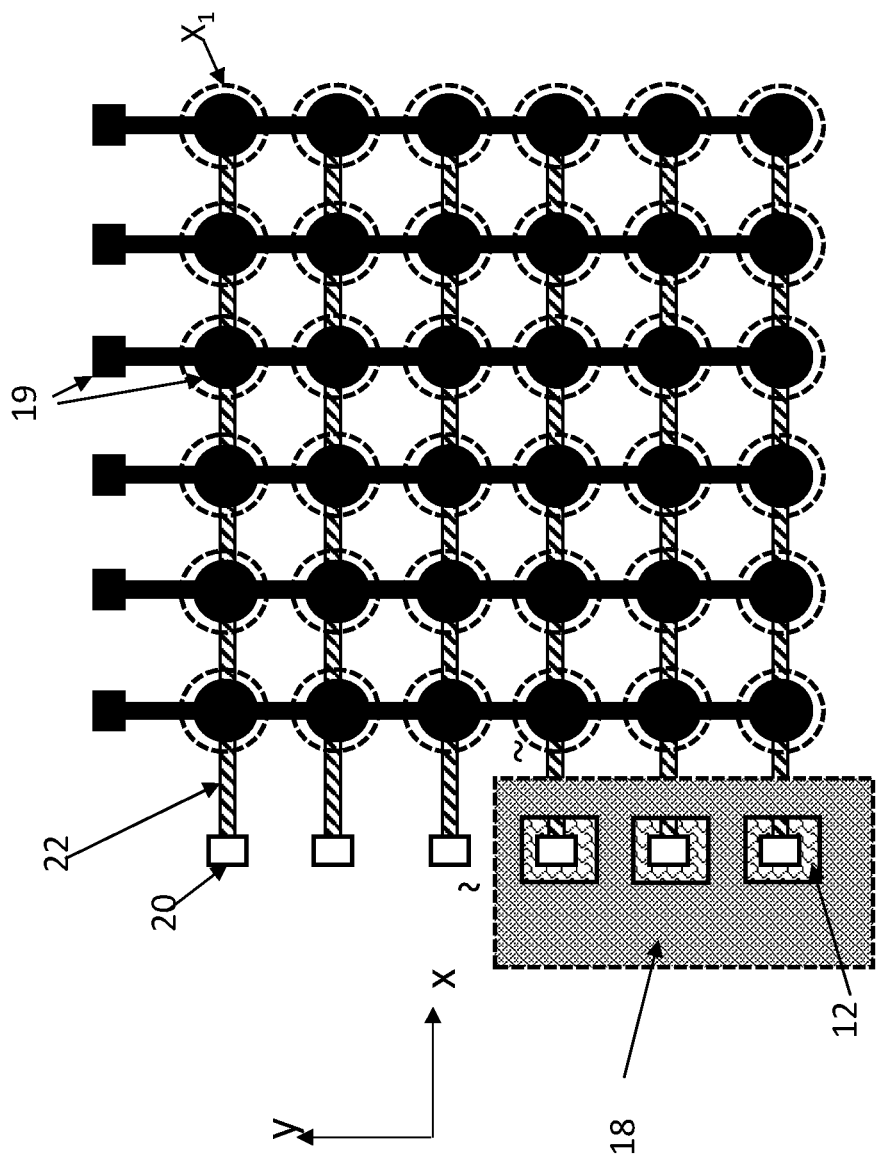
FIG. 5 illustrates a top view of the multilayer structure shown in FIG. 4b.

In FIG. 5 a top view is presented of the multilayer structure of FIG. 4b. The first 19 and second 20 electrode can be seen, as well as the metal layer 22. The region X1 defining the width of the cavity C1 is also indicated. Note that layers 18, 17, 15 are not shown in the figure in order to make layer 22 visible.

Figure 6:
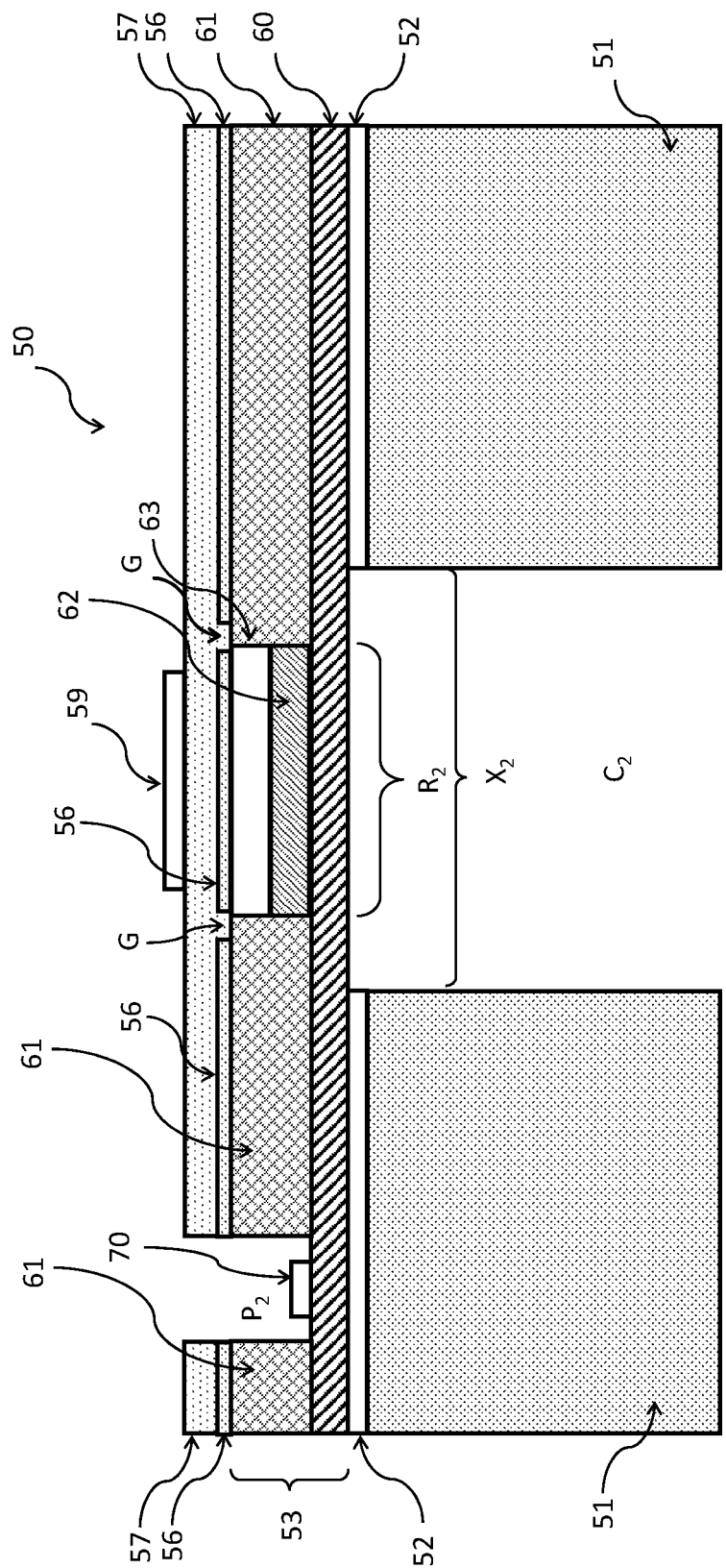
FIG. 6 is a schematic cross-sectional side view of a multilayer structure illustrating a diode in series with the respective ultrasonic transducer according to embodiments of the present invention, wherein the multilayer structure comprises a pMUT layer stack.

Referring to FIG. 6, a second multilayer structure 50, which may be comprised in an ultrasonic transducer array device 1 according to embodiments of the present invention, is shown. Similar to the first multilayer structure 10 as depicted in FIG. 4a, the second multilayer structure 50 comprises a second substrate structure, wherein the second substrate structure may comprise, for example, a second silicon substrate 51, and a second silicon dioxide layer 52 disposed over the silicon substrate 51. The second multilayer structure 50 further comprises a second semiconductor layer stack 53 disposed over the silicon dioxide layer 52, a second electrically conductive layer 56, e.g. a metal layer, disposed over at least a part of the second semiconductor layer stack 53, and a second piezoelectric layer 57 disposed over the second electrically conductive layer 56.

The second semiconductor layer stack 53 of the second multilayer structure 50 may comprise a fourth semiconductor layer 60 disposed over and in contact with the second substrate structure, in particular the silicon dioxide layer 52. The fourth semiconductor layer 60 may be heavily doped with a dopant of the first conductivity type. Indeed, according to embodiments of the present invention, the fourth semiconductor layer 60 may be (a silicon) n+ doped, having a relative concentration between $10^{18}$ and $10^{21}$ per cm$^3$.

A layer 61 may be disposed over the fourth semiconductor layer 60 except in a second central region $R_2$. The second central region R2 comprises at least a portion of the second multilayer structure 50 and extends in the x-direction in which a second top electrode 59 is connected with the at least portion of the second multilayer structure 50. The layer 61 may be a fifth semiconductor layer with a very low doping concentration of a dopant of the first conductivity type or even no doping at all. According to some embodiments of the present invention, the fifth layer 61 is substrate doped with a dopant of the first conductivity type, preferably at least $10^2$ times less than the dopant concentration of a sixth semiconductor layer 62 (see next paragraph). According to other embodiments layer 61 is an isolation layer, for example a polymer layer.

The second semiconductor layer stack 53 may also comprise a sixth semiconductor layer 62 which is disposed over the fourth semiconductor layer 60 in the second central region $R_2$, and a seventh semiconductor layer 63 which is disposed over the sixth semiconductor layer 62 in the second central region $R_2$. According to embodiments of the present invention, the sixth semiconductor layer 62 is n− doped and the seventh semiconductor layer 63 is p+ doped. The combined thickness of the sixth semiconductor layer 62 and the seventh semiconductor layer 63 may be approximately one (1) to five (5) micrometres (μm), without being limited thereto.

A substrate doped region generally has a doping concentration that is less than that of an n− (or p−) doped region by a factor of approximately $10^2$ to $10^3$. An n− (or p−) doped region generally has a doping concentration that is less than that of an n+ (or p+) region by a factor of approximately $10^2$ to $10^4$.

The second multilayer structure 50 further comprises a second piezoelectric layer 57 which is disposed over the second electrically conductive layer 56 and fills the second electrically conductive layer gaps G. The second multilayer structure 50 further comprises a second top electrode 59 disposed on the second piezoelectric layer 57 within the second central region R2. The second multilayer structure 50 also has a second recess P2 which extends through the second piezoelectric layer 57, the second electrically conductive layer 56, and partially through the second semiconductor layer stack 53. A second electrode 70 is provided in the recess P2 on the fourth semiconductor layer 60. A p-n junction diode is formed at the boundary between the sixth and seventh semiconductor layers 62, 63. When a positive voltage difference is applied between the electrodes 59, 70, a depletion layer is formed at the p-n junction and current can flow between the electrodes 59, 70. In specific embodiments of the present invention wherein the capacitor between electrode 59 and 70 is not fully charged, a depletion layer is formed at the p-n junction and current can flow between the electrodes when a positive voltage difference is applied between the electrodes 59, 70.

A second cavity $C_2$ is provided through the second substrate, in particular the silicon substrate 51 and the silicon dioxide layer 52, such that a portion $X_2$ of the layer structure comprising a portion of the semiconductor layer stack 53, the second electrically conductive layer 56, and the piezoelectric layer 57 is suspended over the second cavity $C_2$. This portion $X_2$, along with the electrodes 59 and 70, provide an ultrasonic transducer 2 capable of emitting and receiving ultrasound waves as described hereinbefore in relation to FIG. 4a. The portion $X_2$ of the second multilayer structure 50 overlying or suspending the second cavity $C_2$ may define an ultrasound source and receiver comprising a membrane and a means for causing the membrane to vibrate so as to emit ultrasonic waves. The membrane may be defined by a portion of the semiconductor layer stack 53 and the second electrically conductive layer 56 extending within the second region $X_2$, whereas the means for causing the membrane to vibrate may be defined by at least a portion of the piezoelectric layer 57 and the top electrode 59 within the second region $X_2$.

The first, top or positive electrode 59 can be connected to, or form part of, a row electrode 3 of a transducer array as described hereinbefore. The second, bottom or negative electrode 70 can be connected to, or form part of, a column electrode 4 of a transducer array as described hereinbefore.

The embodiment of a second multilayer structure 50 as shown in FIG. 6 comprises a diode structure referred to as an p-n junction diode. This diode has a p+/n− junction. By connecting a electrically conductive region or layer to a p+ region or layer, the anode may be accessed. The n+ region or layer works as the ground signal connector and is accessed by electrically conductive layer 70 as cathode. The advantage of the very low doped or no doped region is the reduction of all parasitic components.

Figure 7:
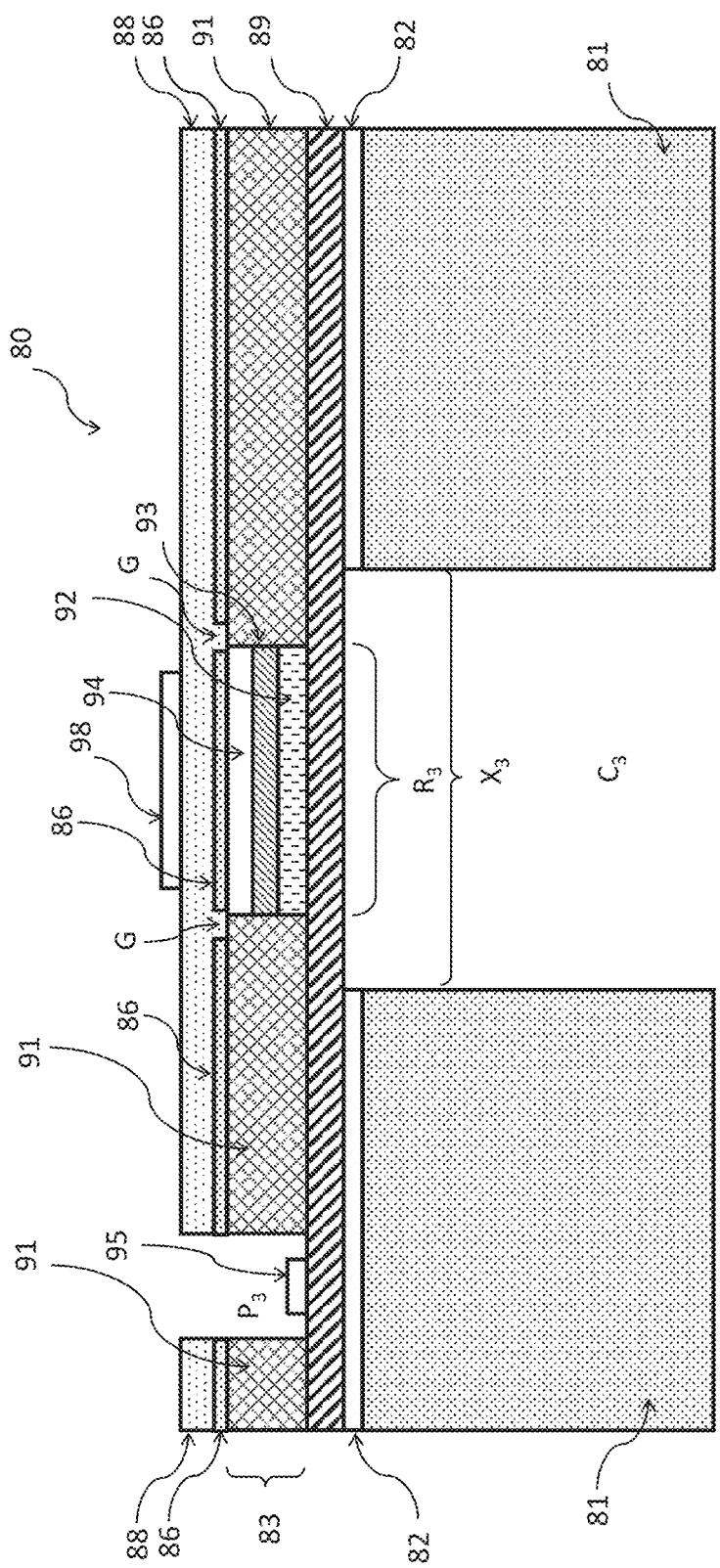
FIG. 7 is a schematic cross-sectional side view of a multilayer structure illustrating a diode in series with the respective ultrasonic transducer according to embodiments of the present invention, wherein the multilayer structure comprises a pMUT layer stack.

The multilayer structure as depicted in FIG. 7 is similar to the second multilayer structure as in FIG. 6 and discussed before, except for a metal layer 89 underneath the semiconductor layer stack 83. This is because n+ has a high resistivity to work as the ground signal and is attached to a metal layer.

Further referring to FIG. 7, a third multilayer structure 80, which may be comprised in an ultrasonic transducer array device 1 according to embodiments of the present invention, is shown. The third multilayer structure 80 is similar to the second multilayer structure 50 and comprises a third substrate structure comprising a third substrate 81 and a third insulating layer, in particular a silicon dioxide layer 82 disposed over the third substrate 81. The third semiconductor layer structure 80 may further comprise a third semiconductor layer stack 83 disposed over the third substrate structure 81,82, a third electrically conductive layer 86 disposed over at least a portion of the third semiconductor layer stack 83, and a third piezoelectric layer 88 of which at least a portion is disposed over the third electrically conductive layer 86.

The third multilayer structure 80 additionally comprises a fourth electrically conductive layer 89 disposed between the third insulating layer 82, in particular the silicon dioxide layer, and the third semiconductor layer stack 83.

The third semiconductor layer stack 83 may be composed as follows. A layer 91 may be disposed over the fourth metal layer 89 except in a third central region R3 between the top electrode 98 and the third substrate structure 81, 82 in the z-direction. The layer 91 may be an eighth semiconductor layer 91 with a very low (or no doping) substrate doping concentration in some embodiments. According to other embodiments layer 91 is an isolation layer, for example a polymer layer.

The third semiconductor layer stack 83 may further comprise a ninth, tenth, and eleventh semiconductor layers 92, 93, 94 respectively, disposed over the second metal layer 89 in that order in the third central region $R_3$. That is, the ninth semiconductor layer 92 is adjacent to the fourth metal layer 89, the eleventh semiconductor layer 94 is adjacent to the third electrically conductive layer 86, and the tenth semiconductor layer 93 is between the ninth and the eleventh semiconductor layers 92, 94. The combined thickness of the tenth and eleventh semiconductor layers 93, 94 is approximately one (1) to five (5) micrometres (μm).

According to embodiments of the present invention, the ninth semiconductor layer 92 may be n+ doped. The tenth semiconductor layer 93 may be n− doped. The eleventh semiconductor layer 94 may be p+ doped. The functioning of these features is the same as explained for corresponding layers in FIG. 6.

A third piezoelectric layer 88 is disposed over the third metal layer 86 and fills the gaps G. The third multilayer structure 80 further comprises a top electrode 98 disposed on the piezoelectric layer 88. The third multilayer structure 80 also has a third recess $P_3$ which extends through the third piezoelectric layer 88, the third metal layer 86, and through the third semiconductor layer 83. A negative voltage electrode 95 is provided in the third recess $P_3$ on the second metal layer 89.

A third cavity $C_3$ is defined by the third substrate structure, in particular a silicon substrate 81 and the silicon dioxide layer 82, such that a portion $X_3$ of the third multilayer structure comprising the fourth metal layer 89, the third semiconductor layer stack 83, the third metal layer 86, and the third piezoelectric layer 88, is suspended over the cavity C3. This third portion X3 may define at least one membrane and at least one means for causing the membrane to vibrate so as to emit ultrasonic waves. Indeed, this portion $X_3$, along with the electrodes 98 and 95, provide an ultrasonic transducer 2 capable of emitting ultrasound waves as described hereinbefore in relation to FIG. 4.

The electrode 98 can be connected to, or form part of, a row electrode 3 of an ultrasonic transducer array device 1 as described hereinbefore. The electrode 95 can be connected to, or form part of, a column electrode 4 of a transducer array as described hereinbefore.

A diode comprised in an array device according to embodiments of the present invention may be provided by a Schottky diode or a p-n diode as described hereinbefore. However, other possibilities for providing the diode are within the scope of the present invention. For example, a field-effect transistor can be used as a diode so as to provide directional current flow.

Figure 8:
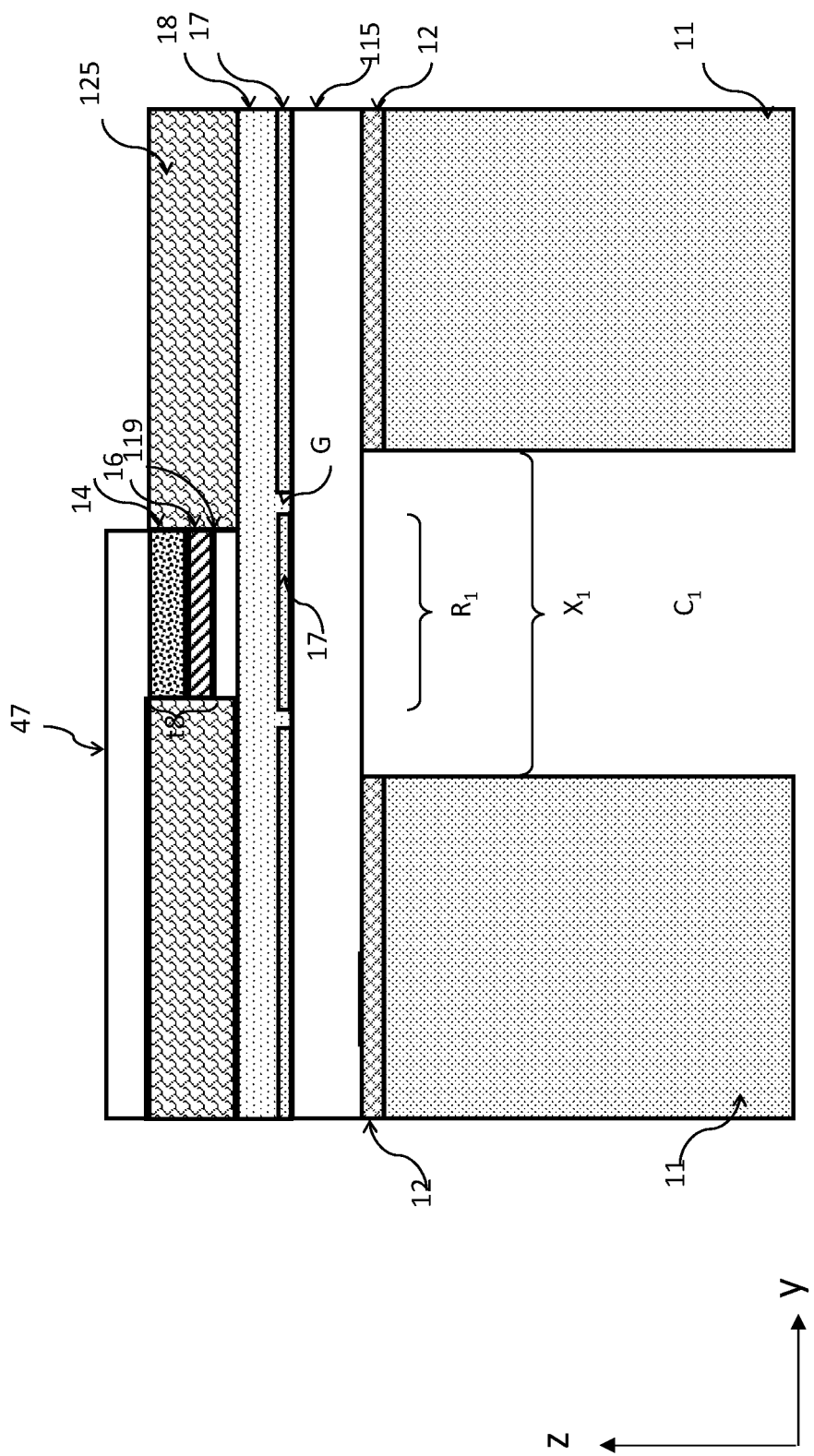
FIG. 8 is a schematic cross-sectional side view of a multilayer structure according to another embodiment of the invention.

Referring to FIG. 8, another embodiment of a multilayer structure according to the invention is presented. The embodiment of FIG. 8 comprises a mechanical layer 115 which may be another semiconductor layer (e.g. Si or SiC) or a polymer or SiO2 or SiN layer. If it is a semiconductor layer, the layer may be doped, e.g. substrate doped with a dopant of the first conductivity type, or not doped at all. In some embodiments the layer 115 may not be present. The MUT layer comprises a piezoelectric layer 18 and a first electrically conductive layer 17. The first electrically conductive layer is disposed on the mechanical layer 115. In the particular embodiment shown in FIG. 8 a first portion of the electrically conductive layer 17 is sandwiched between at least a portion of the piezoelectric layer 18 and the mechanical layer 115. The position of the heavily doped semiconductor layer 14 and the weakly doped semiconductor layer 16 is reversed compared to the embodiments of FIG. 4: the heavily doped semiconductor layer is now farther away from the cavity than the weakly doped semiconductor layer. On top of the structure of FIG. 8 a top electrode electrically conductive track 47 (e.g. a metal track) is shown that covers part of an isolation layer 125 and the semiconductor layer stack defining the diode. This semiconductor layer stack is in this embodiment placed on an electrically conductive layer 119. The semiconductor stack has in FIG. 8 a thickness t8. Note that this semiconductor layer stack can be implemented as any of the semiconductor layer stacks shown in other embodiments provided that the different layers of the stack are placed in reverse order in the z-direction. In some embodiments the electrically conductive layer 119 may comprise a plurality of layers, so forming a multi-layer structure. The isolation layer 125 protects the semiconductor layers e.g. from neighbouring diodes in the array. The semiconductor layer stack may in some embodiments comprise a semiconductor layer heavily doped with a dopant of a second conductivity type sandwiched between the first semiconductor layer and the first portion of the first electrically conductive layer within region R1.

Figure 9:
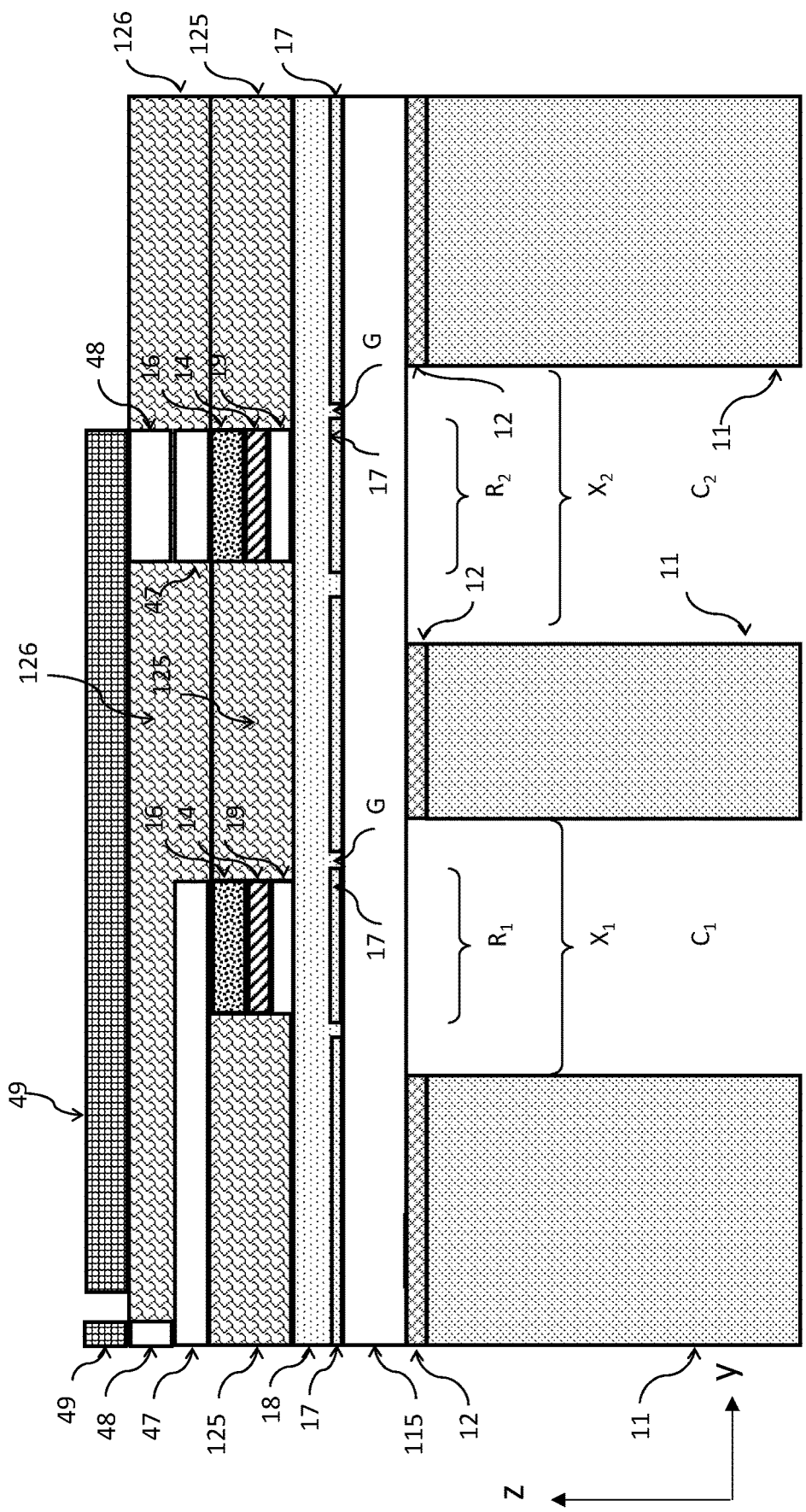
FIG. 9 is a schematic cross-sectional side view of a multilayer structure according to yet another embodiment of the invention.

Embodiments of the multilayer structure of the invention as described previously can be combined in various ways yielding for example multilayer structures with two or even more cavities and/or with additional semiconductor layer stacks and/or a stack of electrically conductive tracks, e.g. metal tracks, together with corresponding isolation layers. For example, FIG. 9 is the same as the FIG. 8 but with pMUTs in regions X1 and X2 and two semiconductor multilayer stacks in regions R1 and R2. The first electrically conductive track 47 is also disposed partially over the second semiconductor multilayer in region R2. The second electrically conductive track 48 disposed on top of the first electrically conductive track 47 on the second region R2. The first electrically conductive track 47 in region R1 and the isolation layer 125 are covered with an isolation layer 126. A third electrically conductive track 49 (e.g. a metal track) is shown that covers part of an isolation layer 126 and the semiconductor layer stack defining the diode in region R2. The third electrically conductive layer 49 acts as the top electrode for the second ultrasonic transducer in region X2. Similarly, more electrically conductive tracks can disposed on top of each other by means of intermediate isolation layers to avoid short circuit.

Figure 10:
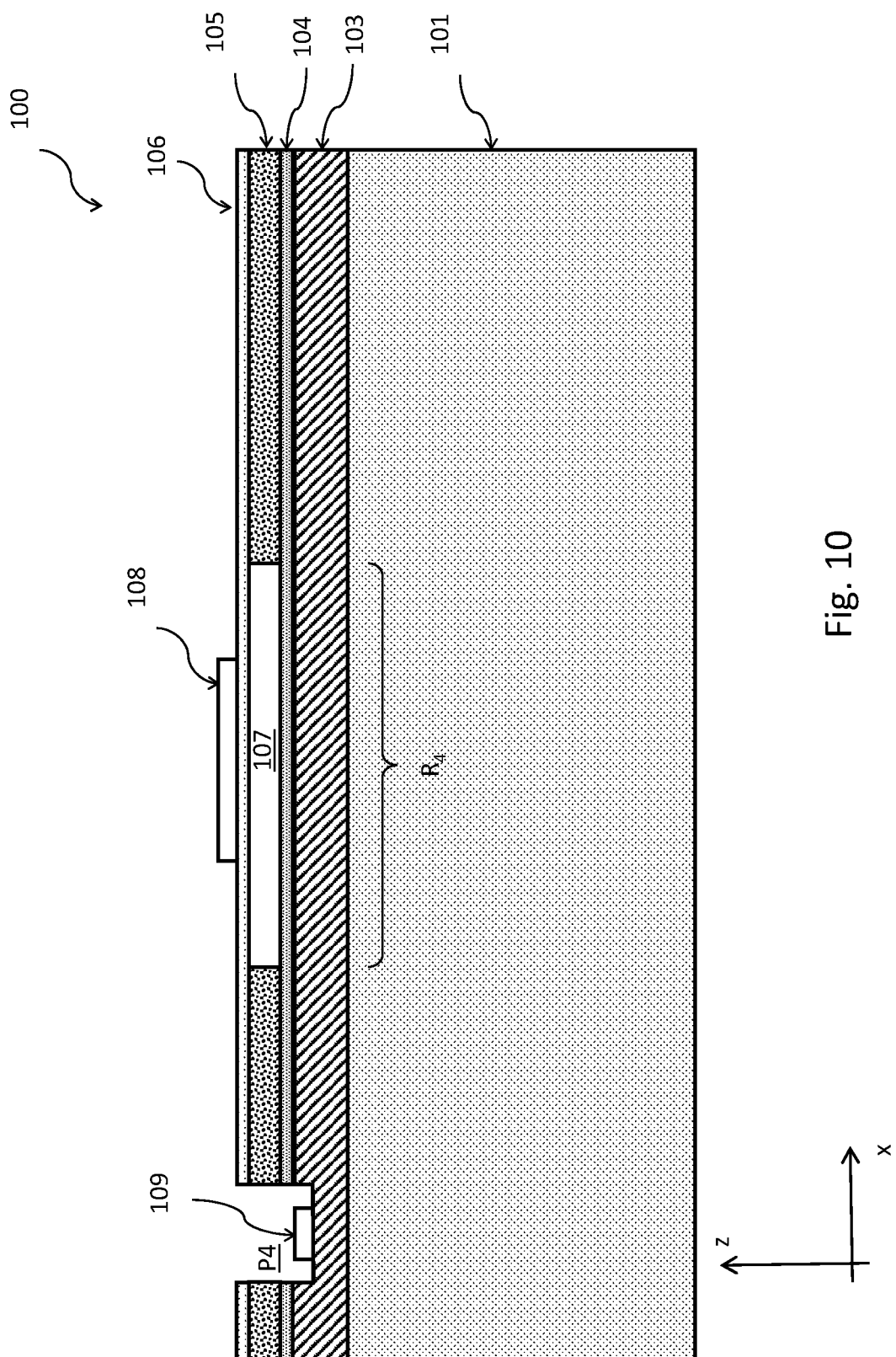
FIG. 10 is a schematic cross-sectional side view of a multilayer structure illustrating a diode in series with the respective ultrasonic transducer according to embodiments of the present invention, wherein the multilayer structure comprises a cMUT layer stack.

Although the example multilayer structures described hereinbefore comprise a piezoelectric layer for forming a pMUT, the principles are equally applicable for providing a cMUT. For example, referring to FIG. 10, a fourth multilayer structure 100 which can be included in an ultrasonic transducer array device 1 according to embodiments of the present invention is shown. The fourth multilayer structure 100 comprises a fourth substrate structure 101, preferably made of silicon, and a fourth semiconductor layer stack 103 disposed over the silicon substrate 101. The fourth semiconductor layer stack 103 in this cMUT-diode configuration may be any of the semiconductor layer stacks 13, 53, 83 described hereinbefore. A fifth electrically conductive layer 104, e.g. a metal layer, is disposed over the fourth semiconductor layer stack 103. A first non-conductive layer 105 is disposed over at least a portion of the fifth electrically conductive layer 104 except in fourth central region $R_4$. A second non-conductive layer 106 is disposed over the first non-conductive layer 105 so as to form a cMUT cavity 107 in the fourth central region $R_4$. The cMUT cavity 107 may be a vacuum cavity. An electrode 108 is disposed over the second non-conductive layer 106 in the fourth central region $R_4$. A fourth recess $P_4$ is provided through the second non-conductive layer 106, the first non-conductive layer 105, and the fifth electrically conductive layer 104. An electrode 109 is disposed in the fourth recess $P_4$ on the semiconductor layer 103. When an alternating voltage is applied between the electrode 108 and the electrode 109, the portion of the second non-conductive layer which is in the fourth central region $R_4$, i.e. is suspended over the cMUT cavity 107, is caused to vibrate due to alternating attraction and repulsion between the electrode 108 and the electrically conductive layer 104. This causes ultrasound waves to be emitted. The vibrations may also exist because of an alternative electrostatic force inside the cMUT cavity 107, which works as a capacitor, and between the two electrodes 104 and 108.

The non-conductive layers 105, 106 may comprise e.g. poly Si, SiN, SiO2 or other polymers.

Embodiments of the ultrasonic transducer multilayer structure as shown in any of FIGS. 6 to 10 may have a protective isolation layer on top.

Figure 11:
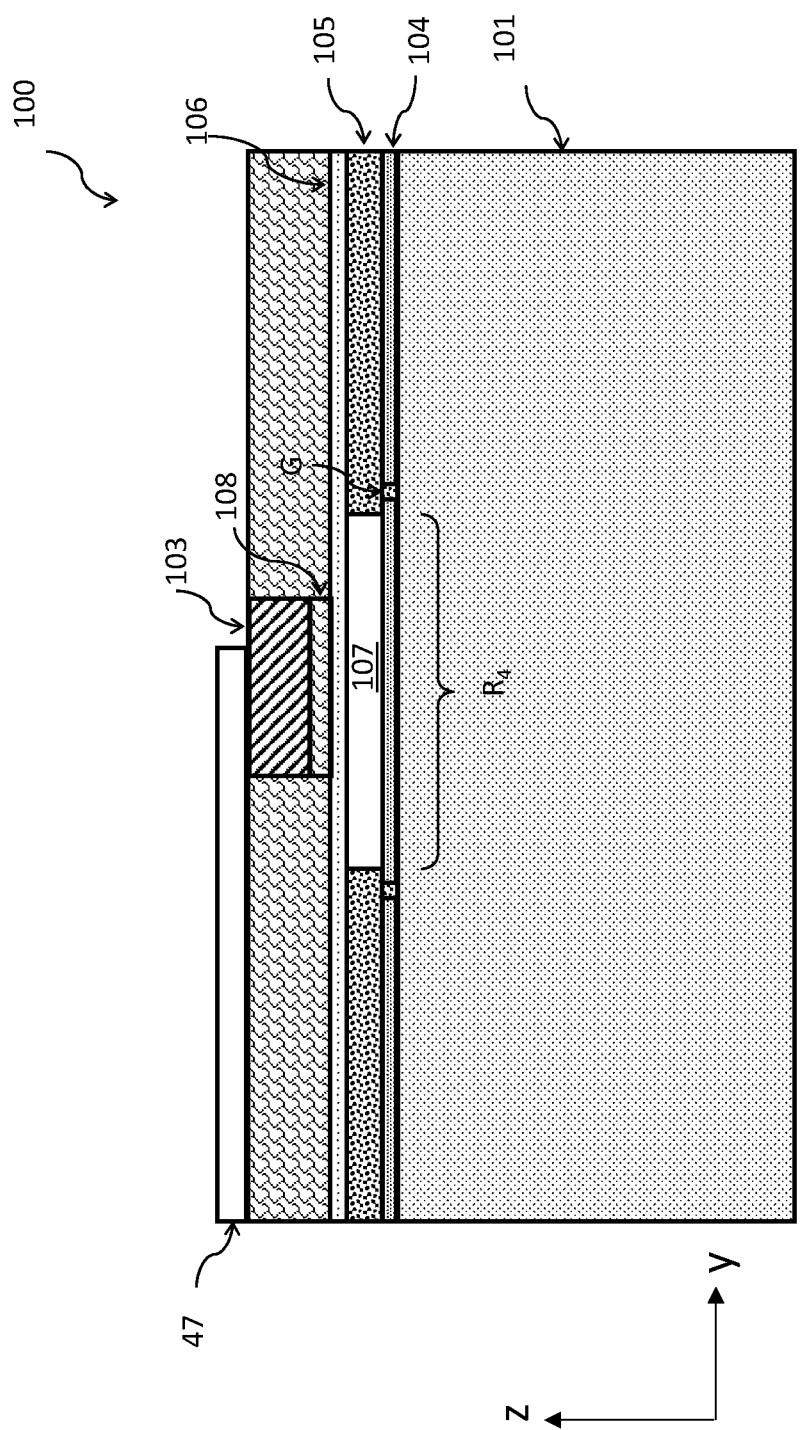
FIG. 11 is a schematic cross-sectional side view of a multilayer structure illustrating a diode in series with the respective ultrasonic transducer according to embodiments of the present invention, wherein the multilayer structure comprises a cMUT layer stack.

In FIG. 11 another embodiment with a cMUT is illustrated. A cMUT cavity is created as explained with respect to FIG. 10 between electrically conductive layer 104 and non-conductive layers 105 and 106. The fourth semiconductor layer stack 103 (which, as already mentioned, may be any of the semiconductor layer stacks 13, 53, 83 described previously) is now positioned on top of the electrode 108 but in reverse order in the z-direction. Just as in FIG. 8, a top electrode electrically conductive track 47 (e.g. a metal track) is provided that at least partially covers the semiconductor layer stack 103. Electrically conductive layer 104 is provided with gaps G in order to avoid the bottom electrode of the various MUTs being connected to each other.

According to embodiments of the present invention, the ultrasonic transducer array device further comprises at least one power source adapted to provide power to the ultrasonic transducer to keep the diode on and activate the receiving function for ultrasonic signals. This power source may be a DC power source arranged in series with the ultrasonic transducer and corresponding diode.

According to another aspect of the invention, a method of manufacturing an ultrasonic transducer array device according to any of the preceding embodiments is presented below. The method comprising the steps of: providing a first wafer according to an array configuration, wherein the first wafer defines a semiconductor layer stack; providing a second wafer, preferably a silicon-based wafer comprising a SiO2 layer or a silicon nitride layer; bonding the first wafer to the second wafer, defining a silicon-on-insulator (SOI) wafer wherein the second wafer defines a buried oxide (BOX) layer of the SOI wafer; processing the first wafer to a predetermined thickness of an ultrasonic transducer array device.

Embodiments of the present invention further comprises the present invention for the manufacturing of an ultrasonic transducer array device comprise the steps of providing a base layer comprising an array of diodes, and fabricating the array of ultrasonic transducers on the base layer.

In particular, embodiments of the method for the manufacturing of an ultrasonic transducer array device having a pMUT layer stack according to the present invention comprise the steps of: Providing a first wafer according to a predetermined array configuration, wherein the first wafer defines a semiconductor layer stack according to at least one embodiment of the invention described before; Providing a second wafer, preferably a silicon-based wafer comprising a SiO2 layer or a silicon nitride layer; Bonding the first wafer to the second wafer, defining a silicon-on-insulator (SOI) wafer wherein the second wafer defines the a buried oxide (BOX) layer of the SOI wafer; and Processing the first wafer to a predetermined thickness of the transducer array device layer.

The processing of the first wafer comprises a thinning down and polishing step.

Embodiments of the method according to the present invention may provide the first wafer which is ion-implemented. The ion-implementation may also be performed after the SOI wafer is formed.

Embodiments of the method according to the present invention may comprise a step adding an electrically conductive layer, having a predetermined pattern corresponding to the predetermined array configuration, on the first wafer before providing the second wafer using a deposition technique like physical vapour deposition (PVD) or chemical vapour deposition (CVD), without being limited thereto.

The method further comprises the steps of
depositing a second electrode, or bottom electrode, on the SOI wafer;
depositing a piezoelectric layer on the SIO wafer and patterning it to access the ground electrode;
depositing a first electrode, or top electrode, on top of each membrane;

realizing the membrane using a deep reactive ion etching (DRIE) process on the back side of the second wafer; and
removing the BOX layer by etching, wherein the etching process may be a hydrogen fluoride (HF) etching process without being limited thereto.

According to embodiments of the present invention, the first electrode, or top electrode, may be smaller than each membrane.

Figure 12A:
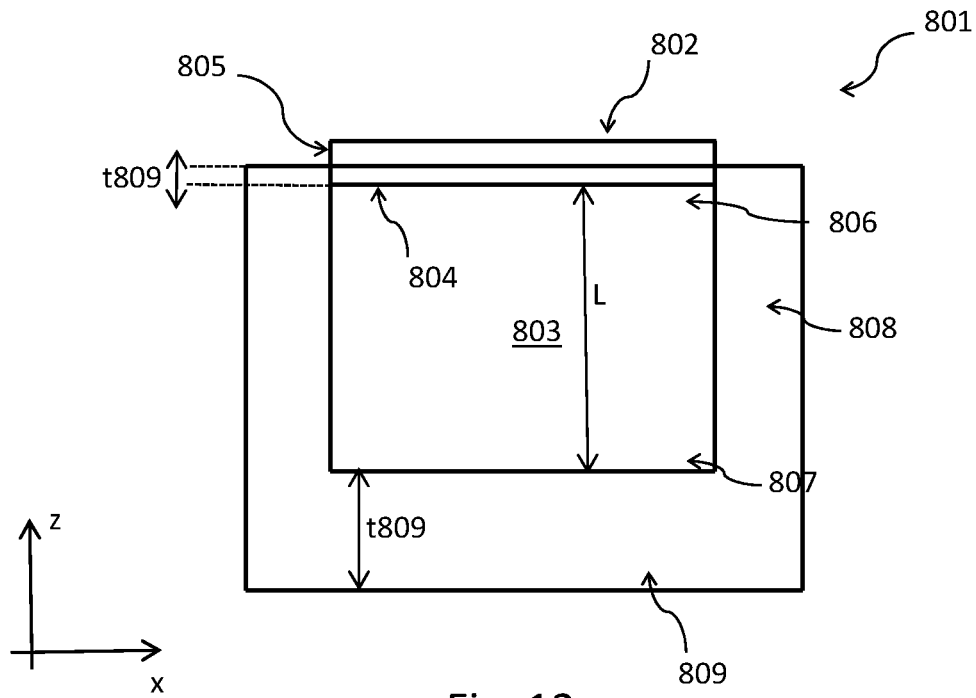
FIG. 12a is a schematic cross-sectional side view in the z-x plane of a micro-machined ultrasonic transducer "at rest" according to embodiments of the invention.
Figure 12B:
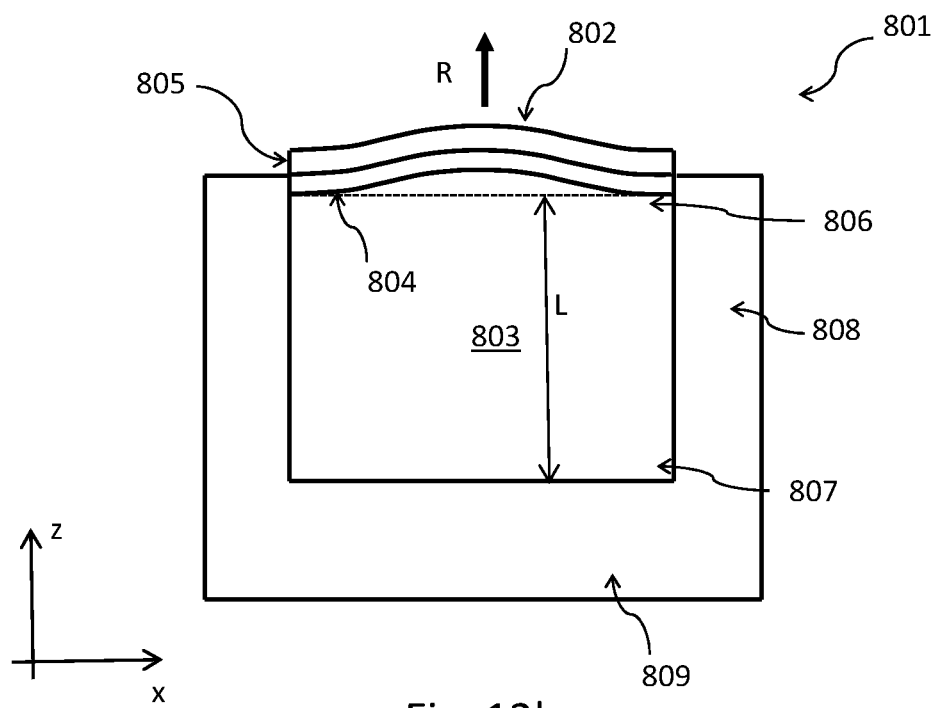
FIG. 12b is a schematic cross-sectional side view of a micro-machined ultrasonic transducer "activated" according to embodiments of the invention.
Figure 12C:
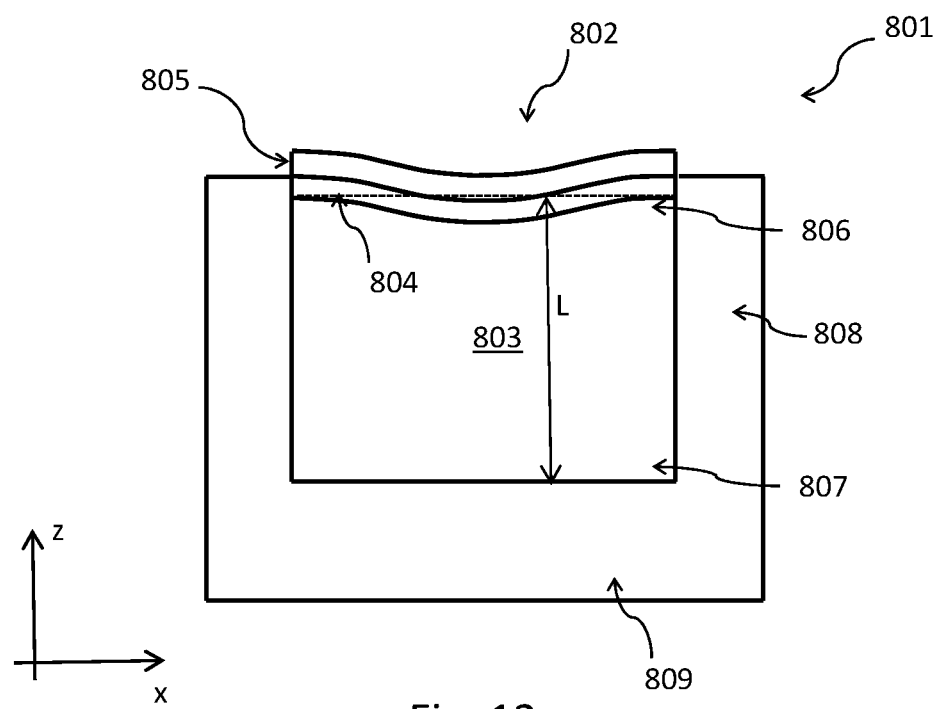
FIG. 12c is a schematic cross-sectional side view of a micro-machined ultrasonic transducer "activated" according to embodiments of the invention.

Referring to FIGS. 12a to 12c, a micro-machined ultrasonic transducer (MUT), according to embodiments of the present invention is shown. Both capacitive MUTs, hereinafter also referred to as "cMUT" or "cMUTs", and piezoelectric MUTs, hereinafter also referred to as "pMUT" or "pMUTs", are micro-electro-mechanical systems (MEMs) devices manufactured using semiconductor batch fabrication.

The transducer 801 comprises an ultrasound source 802 and a cavity 803 acoustically coupled to the at least one ultrasound source 802. The cavity 803 may be a pMUT or cMUT cavity as described in relation to the present invention above.

The ultrasound source 802 comprises at least one vibratable membrane 804, having a membrane thickness defined along a first direction (z-direction), and at least one means 805 for causing the at least one vibratable membrane 804 to vibrate so as to emit ultrasonic waves and/or for detecting a vibration of the at least one vibratable membrane 804 in order to receive ultrasonic waves. The at least one vibratable membrane 804 may be at least a portion of the semiconductor layer stack defining a diode and a first electrically conductive layer disposed on the semiconductor layer as described in relation to embodiments of the present invention above. The at least one means 805 for causing the at least one vibratable membrane 804 to vibrate so as to emit ultrasonic waves and/or for detecting a vibration of the at least one vibratable membrane 804 in order to receive ultrasonic waves, may be a portion of the MUT layer stack disposed on the first electrically conductive layer and an electrode disposed on top of the MUT layer stack.

As used herein, and unless otherwise specified, when reference is made to the at least one vibratable membrane, reference may also be made to membrane 804.

As used herein, and unless otherwise specified, when reference is made to at least one means for causing the at least one vibratable membrane to vibrate so as to emit ultrasonic waves and/or for detecting a vibration of the at least one vibratable membrane in order to receive ultrasonic waves, reference may also be made to means for causing the membrane to vibrate, or means 805.

The cavity 803 has a first end 806 and a second end 807, wherein the second end 807 is opposed to the first end 806 along the first direction (z-direction). The cavity 803 is bounded by a side wall 808, the membrane 804 at the first end 806, and an end wall 809 (hereinafter also referred to as second end wall 809) at the second end 807. The membrane 804 is located at the first end 806 of the cavity and closes the first end 806 of the cavity. For example, the membrane may be bonded to the side wall 808 at the first end of the cavity. Preferably, the side wall 808 and the second end wall 809 are monolithic. This can help to simplify fabrication of a transducer 801. In some embodiments, the side wall 8 may be provided separately to the second end wall 809 and may be fixed to the second end wall 9 by, for example, applying an adhesive or using a bonding process.

As will be described in more detail hereinafter, the at least one means 805 for causing the membrane to vibrate may comprise, for example, a layer of piezoelectric material for forming a pMUT or a multilayer structure together with a vacuum cavity for forming a cMUT. Each MUT can transmit and receive acoustic waves. Acoustic waves are generated when a voltage difference is applied across a first electrode and a second electrode in contact with the means 805. Conversely, arriving or detected acoustic waves creates motion in the MUT, producing an electric signal detected by the means 805.

Referring in particular to FIG. 12a, depicting a schematic cross-sectional view in the z-x plane of a transducer in an "at-rest" configuration or state according to embodiments of the invention, wherein the membrane 804 is undeformed.

Referring to FIGS. 12b and 12c, depicting the same schematic cross-sectional view as in FIG. 12a of a transducer in an "activated" configuration according to embodiments of the present invention, wherein the membrane 804 is caused to vibrate by the means 805, the membrane 804 is periodically displaced in the z direction and moves between a maximum displacement in the z direction away from the cavity (FIG. 12b), and a maximum displacement in the z direction within the cavity (FIG. 12c).

The side wall 808 may be a single continuous side wall, for example if the cavity 803 has a cylindrical shape and thus a circular cross-section as taken in a plane parallel to the membrane 804 at rest, i.e. the x-y plane where the y axis is perpendicular to the x and z axes shown in the Figures. The side wall 808 may be composed of several adjoining side walls, for example if the cavity has a cross-section in the x-y plane which is polygonal. For example, the cavity 803 may have a cuboid shape and the cross-section may be square shaped.

Providing the membrane 804 such that the first end 806 of the cavity is closed allows the transducer to be used while in contact with a liquid or gel without the risk that the liquid or gel will leak into the cavity, which could change the acoustic properties of the transducer and damage the transducer.

The membrane may comprise a ceramic such as SiO2, SiC, or $Al_2O_3$; a semiconductor such as silicon; a polymer; a carbon based material such as a diamond thin film; a glass or quartz; or other suitable thin film.

The cavity 803 is acoustically coupled to the membrane 804 through at least one medium or material inside the cavity and is capable of supporting standing waves generated by the membrane 804. The at least one medium or material inside the cavity 804 is at least partly connected to the membrane 804 and is a gas material, solid material or liquid material, including, without being limited thereto, air, helium, silicone oil, castor oil, gel, polyurethane, polyester, epoxy resin, foamed plastics, foamed metal, soft rubber, silicone rubber, sound absorption rubber, butyl rubber, glass wool, glass fibre, felt, silk, cloth and micro-perforated panel.

The periodic oscillation of the membrane 804 causes corresponding periodic changes in the pressure in the cavity 803; provided that the frequency f of the oscillation of the membrane 804 satisfies the relationship as presented in equation (1):

$$f = (2n-1)\frac{v}{4L} \qquad (1)$$

where n is a positive integer, v is the speed of sound in the cavity 803, and L is the length of the cavity. A standing wave can be set up in the cavity 803 with a node at the second end 807 and an antinode at the membrane 804. The length L of the cavity 803 is measured between the first end 806 and the second end 807 of the cavity 803 when the membrane 804 is undeformed. The resonance frequency of the membrane 804 depends on its constructional characteristics like geometry, thickness, diameter, etc., as well as its mechanical properties as well as the mechanical properties of the other layers on top of the membrane and their mutual effect on each other, such as the effect of the residual stress of one layer to the other. If the source of the ultrasound is a cMUT, which means that that membrane 804 is the membrane of a cMUT floating on a vacuum cavity embedded in the means 805, then the resonance frequency is also dependent to the DC bias voltage of the cMUT.

In order to support a standing wave, the cavity 803 does not contain a vacuum and is filled with at least one acoustically suitable medium such as a gas, solid or liquid medium, including, without being limited thereto, air, helium, silicone oil, castor oil, gel, polyurethane, polyester, epoxy resin, foamed plastics, foamed metal, soft rubber, silicone rubber, sound absorption rubber, butyl rubber, glass wool, glass fibre, felt, silk, cloth and micro-perforated panel. The at least one acoustically suitable medium allows a standing wave to have a specific wavelength for a given length L of the cavity 803 and frequency in which the standing wave originates.

According to preferred embodiments of the invention, the acoustically suitable material may lead to damping of the resonance and widening of the bandwidth of the MUT.

A cavity 803 which contains a vacuum is not capable of supporting a standing wave. An acoustically suitable material is one which is capable of compression and expansion when subjected to a force due to the movement of the membrane 804, such that the membrane 804 does not lose contact with the material during vibration. If the cavity 803 is filled with a non-gas medium, the stiffness and rigidity of the cavity filling material should be significantly less than the stiffness and rigidity of the membrane 804, to avoid that the cavity filling material prevents or restricts the membrane 804 from vibration and changes the mechanical properties of the whole device undesirably. In some embodiments, for example if the walls 808, 809 of the cavity 803 comprise a conductive material, the material of the walls may be chosen as a material with a relatively small electrical conductivity so as not to interfere with a fabrication process.

Preferably, the acoustic impedance of the medium or material contained in the cavity 803 is substantially different from the acoustic impedance of the second end wall 809 at the second end 807 of the cavity 803. This has the advantage that a substantial proportion of the ultrasound wave in the cavity 3 can be reflected back by the second end wall 809 at the second end 807 and contribute to a strong standing wave. The acoustic impedance of the medium contained in the cavity may be different than the acoustic impedance of the second end wall 809 at the second end 807. According to embodiments of the invention, the acoustic impedance may be at least fifty (50) times smaller or greater than the acoustic impedance of the second end wall 809 at the second end 807, more preferably at least one hundred (100) times greater or smaller, and still more preferably at least five hundred (500) or at least one thousand (1000) times greater or smaller.

The membrane 804 exhibits an increased amplitude of vibration when caused to vibrate at a frequency which is among the resonance frequencies of the cavity 803, as compared to when the membrane 804 is caused to vibrate at a frequency which is not a resonance frequency of the cavity 803. When the cavity length L is an odd integer multiple of $\lambda/4$, where $\lambda$ is the wavelength of the transmitted ultrasound wave in the cavity 803, maximum constructive interference of the transmitted wave from the first end 806 and the reflected wave from the opposite second end 807 occurs at the interface between the cavity 803 and the membrane 804. This constructive interference provides an additional driving force for the vibration of the membrane 804, increasing the amplitude of the vibrations compared to situations where constructive interference does not occur. Thus, by choosing an appropriate cavity length L, the output pressure of the transducer can be increased. The output ultrasound waves are emitted in a direction R which is generally in the z direction as shown in FIG. 12b.

The cavity length L does not need to be precisely equal to $\lambda/4$ in order to obtain an increased output pressure of the transducer. Indeed, the length L of the cavity can be any odd product of $\lambda/4$ with an error margin of $\pm \lambda/2$. For example, a cavity length L of five (5) times $\lambda/4$ or seven (7) times $\lambda/4$, where $\lambda$ is constant, is sufficient to support a standing wave with a resonance frequency of $f=c/\lambda$, wherein c is the speed of light in vacuum. Any variation in the length L between $\pm \lambda/2$ may cause an error in the standing wave resonance frequency. The amount of tolerance may depend on the application. For example, for imaging application, a membrane with a resonance frequency of one (1) to ten (10) Megahertz (MHz) underwater or gel, has a bandwidth of about 50-100% the centre frequency $f_0$ (which depends on the application). Therefore, the frequency of the standing wave can be in the range of $f_0 \mp 0.25 \cdot f_0$. As a result, the length L of the cavity can be between $0.8 \times L < L < 1.33 \times L$, where $L = n \times \lambda/4$ and n is an odd number.

A further advantage of providing a cavity 803 capable of supporting standing waves is that this allows tailoring of the bandwidth of the emitted ultrasonic waves. The bandwidth can be increased due to the frequencies of the cavity 803 combining with the frequency of the membrane 804, thus providing a transducer 801 with multiple resonance frequencies and therefore a broader bandwidth than a transducer which does not comprise a cavity capable of supporting standing waves.

Furthermore, the at least one acoustically suitable medium in the cavity 803 can help to damp vibration of the membrane 804, which helps to prevent ringing without requiring damping layer(s) to be provided on the membrane 804. Air as a cavity filling material provides some damping, and more damping can be provided if the cavity filling material comprises for example a permanent liquid such as an oil or gel. The cavity of a transducer 801 according to the present invention may also be filled with solid material, for example, solid resins.

A cavity filling material which provides substantial damping can reduce the displacement of the membrane and thus the output pressure, resulting in a lower signal-to-noise ratio, which can be compensated for example by use of a low noise analogue amplifier. Preferably, the solid material has a small amount of elasticity, which is higher than the membrane of the ultrasound source. Therefore, since the membrane is attached completely to the solid material according to embodiments of the present invention, it will be damped by the elasticity of the solid material.

Preferably, the flexural rigidity of the second end wall 809 is larger than the flexural rigidity of the membrane 804, which can be implemented by choosing the thickness t809 of the second end wall 809 in the z direction to be substantially greater than the thickness t804 of the membrane 804. This can help to reduce or avoid acoustic excitation of the second end wall 809 which would interfere with the standing wave in the cavity 803 and may add undesired mode of vibration in the transducer as a whole. Suitable thicknesses depend on the mechanical properties of the material of the membrane 804 and of the second end wall 809 and can be determined, for example, through experimentation by varying thicknesses t1 and/or t2 and measuring the output modes of the transducer. For example, in some embodiments the membrane 804 comprises silicon and has a thickness five (5) micrometres (μm) and the second end wall 809 comprises stainless steel and has a thickness of 0.5 millimetres (mm).

For similar reasons, i.e. preventing or reducing acoustic excitation of the side wall 808, preferably the acoustic impedance of the side wall 808 is substantially larger than the acoustic impedance of the material in the cavity 803.

Figure 13A:
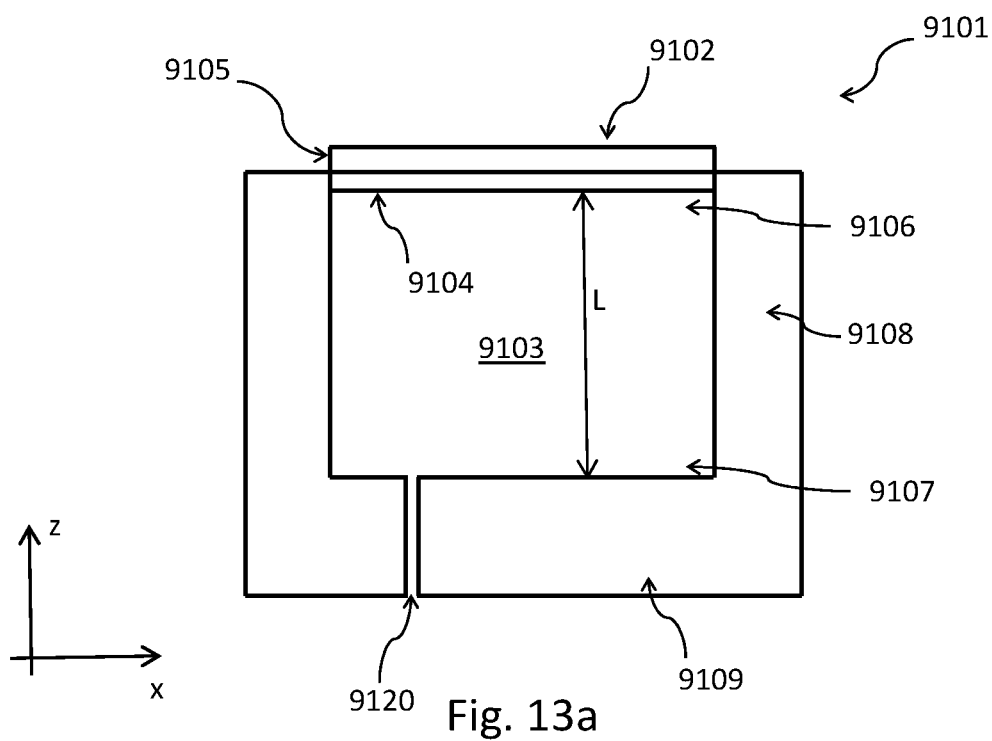
FIG. 13a is a schematic cross-sectional side view of a micro-machined ultrasonic transducer comprising a first micro-channel according to embodiments of the invention.

Referring to FIG. 13a, a cross-sectional view of a first modified transducer 9101 according to embodiments of the present invention is illustrated. The first modified transducer 9101 is similar to the transducer 801 described in relation to FIGS. 12a to 12c. In addition to the features of the transducer 801, the first modified transducer 9101 comprises a first micro-channel 9120 through the second end wall 9109, having an opening at the second end 9107 of the cavity 9103. The first micro-channel 9120 connects the cavity 103 to the external environment of the first modified transducer 9101.

Figure 13B:
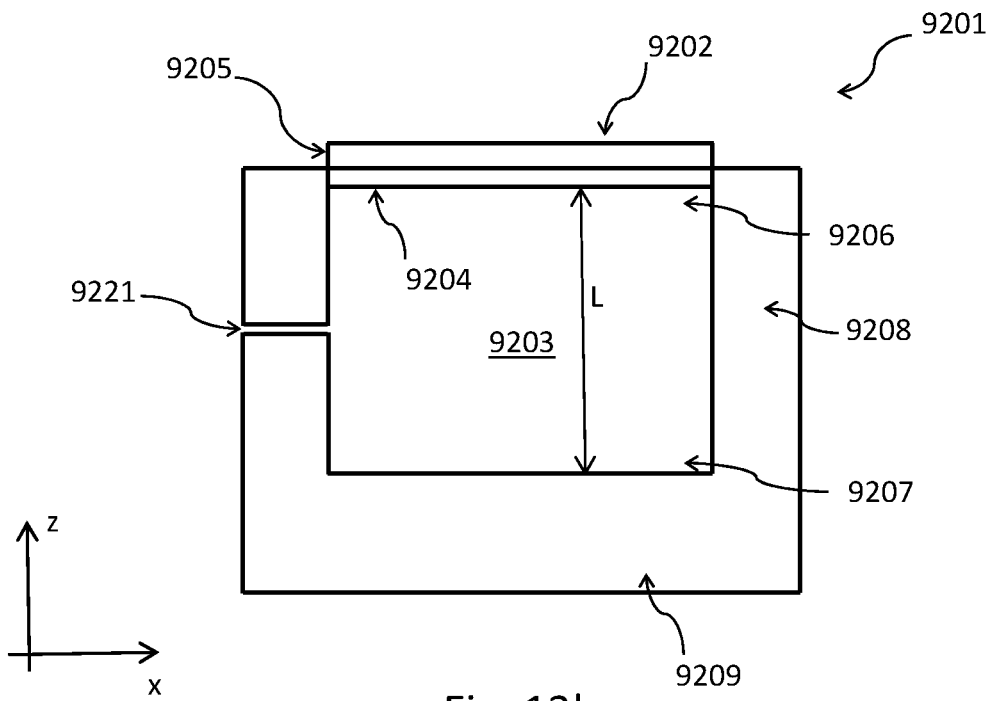
FIG. 13b is a schematic cross-sectional side view of a micro-machined ultrasonic transducer comprising a second micro-channel according to embodiments of the invention.

Referring to FIG. 13b, a second modified transducer 9201 according to embodiments of the present invention. The second modified transducer 9201 is similar to the transducer 801 described in relation to FIGS. 12a to 12c. In addition to the features of the transducer 801, the second modified transducer 9201 comprises a second micro-channel 9221 through the side wall 9208. The second micro-channel 9221 connects the cavity 9203 to the external environment of the second modified transducer 9201. In some embodiments, a transducer can include both the first micro-channel 9120 and the second micro-channel 9221.

The micro-channels 9120, 9221 can provide a means for regulating the pressure of the medium in the cavity 9103, 9203, such that preferably the pressure within the cavity 9103, 9203 is constant. The micro-channels 9120, 9221 can provide an inlet for replenishing the medium in the cavity, for example if gradual leakage occurs. The micro-channels 9120, 9221 can help to provide reliable performance of the transducer 9101, 9201 at varying temperatures, by providing an escape path for the medium if the temperature of the medium has increased, causing it to expand and the pressure in the cavity 9103, 9203 to increase.

For example, if the medium is air, the micro-channels 9120, 9221 can provide an escape path to the environment surrounding the transducer without needing further components. In some embodiments, for example if the medium comprises a gas which is not present in the environment surrounding the transducer 9101, 9201 or if the medium comprises a fluid, an overflow compartment (not shown) may be provided adjacent to the transducer 9101, 9201 which is connected to the microchannel 9120, 9221, for example via microfluidics, so as to allow exchange of the medium between the overflow compartment and the cavity 9103, 9203.

Preferably, the cavity 9103, 9203 has a cross-sectional dimension which is substantially the same as a cross-sectional dimension of the membrane 804. The cross-sectional dimension is measured in the x-y plane. This can help to prevent or reduce divergence of the acoustic wave generated by the transducer within the cavity, in the direction in which the cross-sectional dimension is measured. By reducing divergence, the amplitude of the standing wave can be increased.

More preferably, the cross-section of the cavity 803 in the x-y plane is substantially the same as the cross-section of the membrane 804 in the x-y plane. This can allow divergence to be reduced in more than one direction.

In embodiments wherein the length L of the cavity is comparable to the near field of the transducer (as defined below), the cavity cross-sectional dimension or cross section does not necessarily need to be substantially the same as the cross-sectional dimension or cross section of the membrane, as the length L of the cavity is small enough that far field behaviour is not reached at the second end of the cavity.

The ultrasound source 802 has a near field distance $D_{nf}=A/\pi\lambda$, where A is the area of the membrane 804, also referred to as the membrane area, and $\lambda$ is the wavelength of ultrasonic waves in the cavity. The membrane area is measured in a plane in or parallel to the x-y plane. For example, for a circular membrane of radius a the near field distance is $\alpha^2/\lambda$, where $\alpha$ is the radius of the membrane.

In some embodiments, the cavity length L is less than the near field distance $D_{nf}$. Such a configuration allows for high amplitude of the standing wave without requiring the dimensions of the membrane and the cavity in the x-y plane to be similar, as the distance over which the ultrasound wave propagates within the cavity before reflection is less than the near field distance and so no significant divergence occurs. A suitable cavity length L for such a configuration depends on the frequency of the standing wave, which depends on material properties of the membrane and the cavity filling material as described hereinbefore, and can be determined for example by simulations or by experiment.

In some embodiments, the cavity length L is greater than the near field distance $D_{nf}$. This allows for easier fabrication of the transducer. Another advantage of such an arrangement is that specific frequencies of the ultrasound wave can be achieved which require cavity lengths L longer than the near field distance $D_{nf}$. A suitable cavity length L for such a configuration depends on the frequency of the standing wave, which depends on material properties of the membrane and the cavity filling material as described hereinbefore, and can be determined for example by simulations or by experiment.

Figure 14:
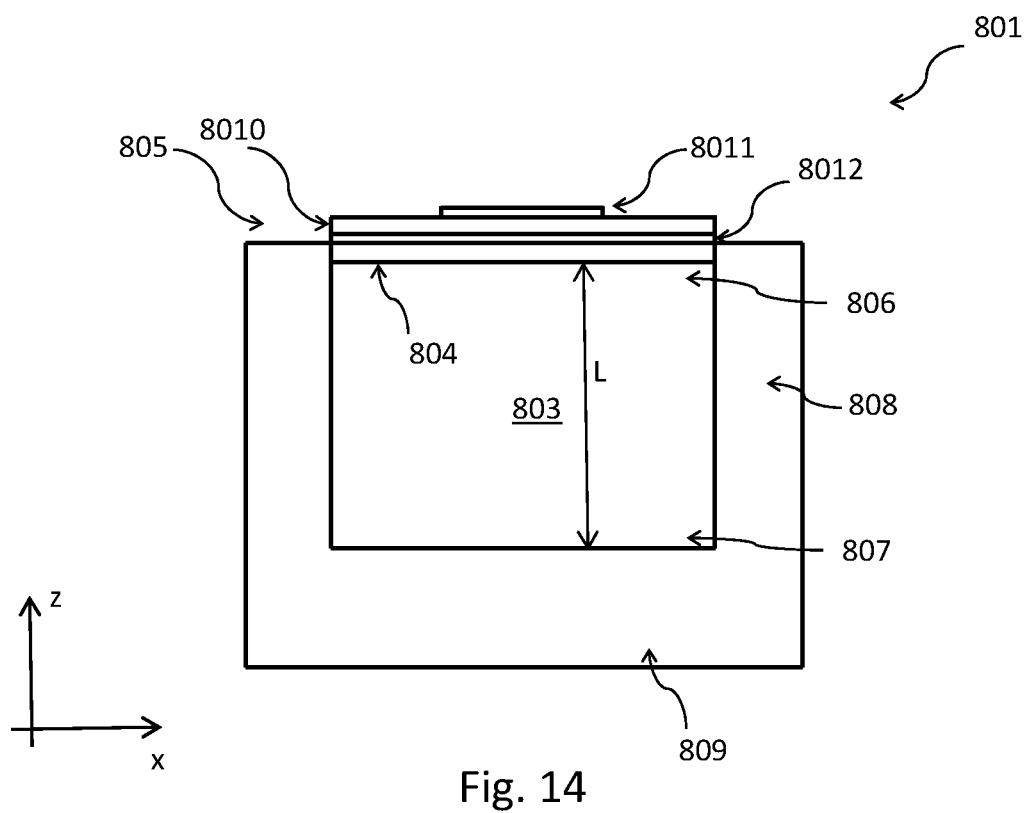
FIG. 14 is a schematic cross-sectional side view of a micro-machined ultrasonic transducer comprising a piezo-electric layer according to embodiments of the invention.

Referring to FIG. 14, the means 805 for causing membrane 804 to vibrate preferably comprises a piezoelectric layer 8010 disposed over the membrane 804 and first and second electrodes 8011, 8012 respectively.

Suitable materials for forming the piezoelectric layer 8010 include lead zirconate titanate (PZT), aluminium nitride (AlN), lead magnesium niobate (PMN), PMN-PZT, polyvinylidene fluoride (PVDF), zinc oxide (ZnO), among others. The first electrode 8011 is disposed over the piezoelectric layer and the second electrode 8012 is disposed between the piezoelectric layer 8010 and the membrane 804. By applying an AC voltage to the piezoelectric layer 8010 via the first and second electrodes 8011, 8012, the piezoelectric layer 8010 can be caused to expand and contract at the frequency of the AC voltage. As the piezoelectric layer is attached to the membrane 804 by its lateral interface, its lateral expansion and contraction causes the membrane to vibrate.

In some embodiments, the piezoelectric layer 8010 is comprised in the membrane 804. For example, the membrane 804 may comprise a multilayer stack comprising electrically conductive layer(s) and piezoelectric layer(s).

Figure 15:
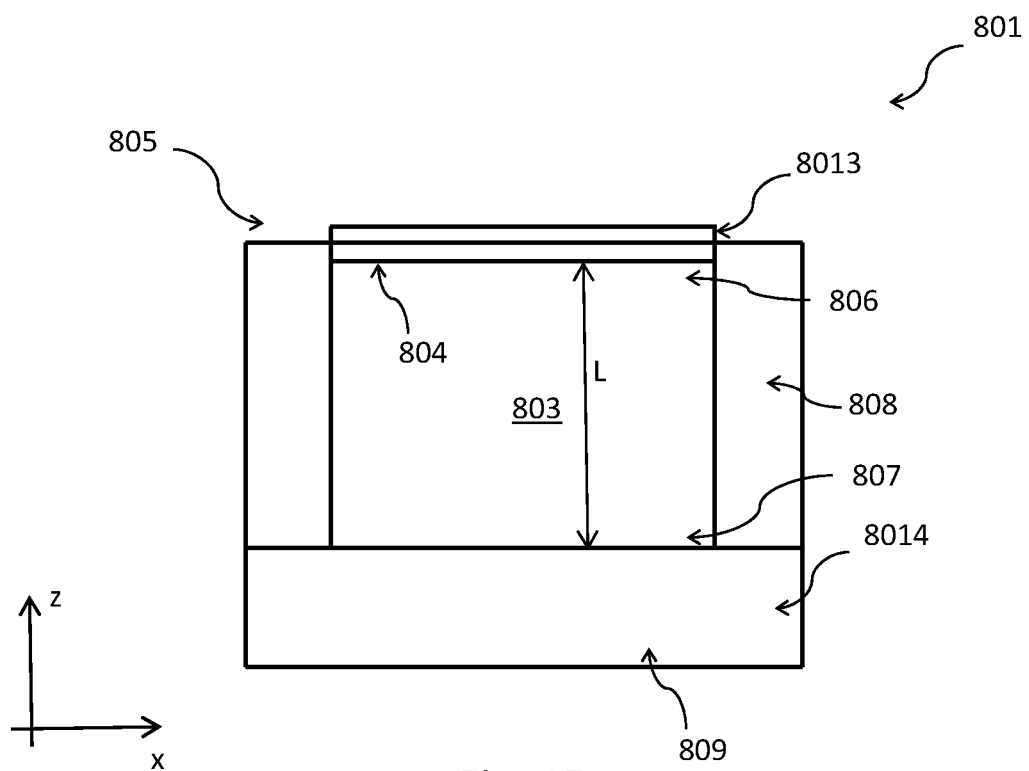
FIG. 15 is a schematic cross-sectional side view of a micro-machined ultrasonic transducer according to embodiments of the invention.

Referring to FIG. 15, in some embodiments, the means 805 comprises a first electrically conductive layer 8013, e.g. a metal layer, disposed over the membrane 804 which, in combination with a second electrically conductive layer 8014, e.g. a metal layer, arranged such that the membrane 804 is between the first electrically conductive layer 8013 and the second electrically conductive layer 8014 in the z direction, forms a pair of electrodes which can serve as a capacitor. By applying an AC voltage across the electrodes, the membrane is caused to vibrate at the frequency of the AC voltage. The second electrically conductive layer 8014 can be provided by, for example, a substrate 8015 which seals the second end 807 of the cavity 803 and on which the side walls 808 are supported. In some embodiments, the substrate 8015 comprises a multilayer stack and the second electrically conductive layer 8014 can be provided by a layer in the multilayer stack, for example a titanium/platinum layer. In some embodiments, the second electrically conductive layer 8014 may be provided by a buffer layer in a multilayer stack, for example in a SrRuO3 (SRO)//La0.5Sr0.5CoO3(LSCO)//CeO2//yttria-stabilized zirconia (YSZ) configuration.

The first electrically conductive layer 8013 may comprise, for example, aluminium, silver, platinum, molybdenum, titanium, chromium, or other suitable metals.

Figure 16A:
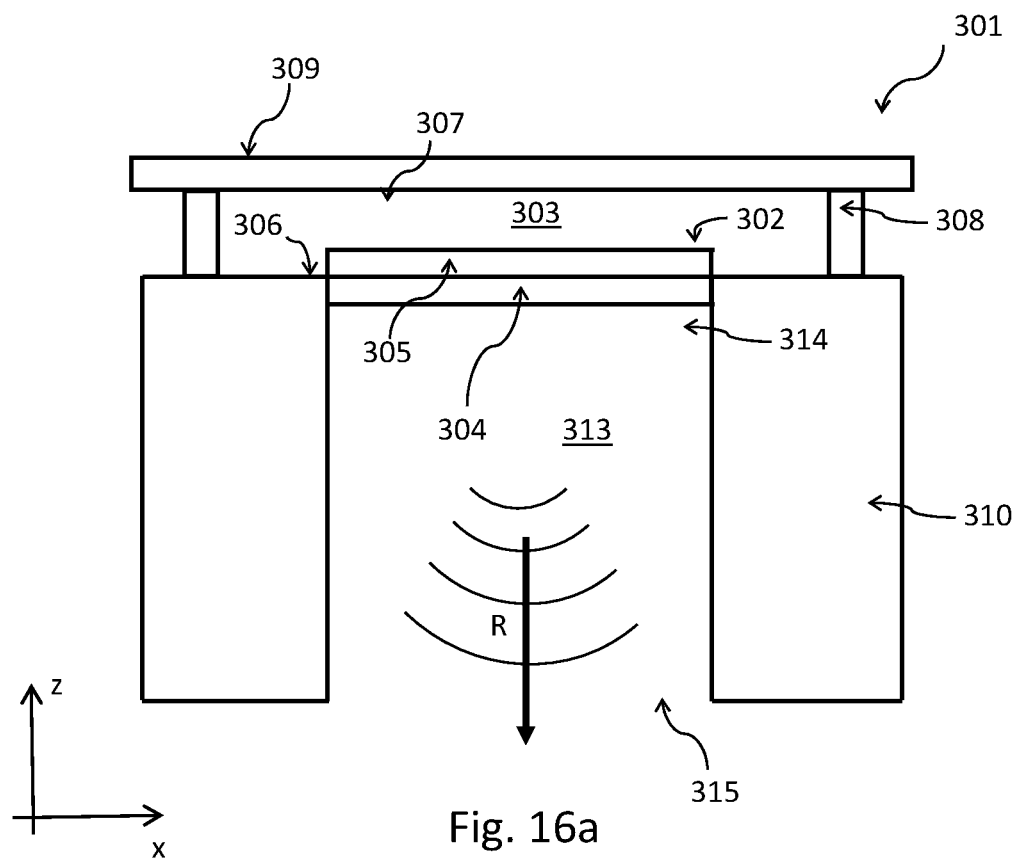
FIG. 16a is a schematic cross-sectional side view of an alternative micro-machined ultrasonic transducer according to embodiments of the invention.

Referring to FIG. 16a, an alternative transducer 301 according to embodiments of the present invention is shown. The transducer 301 comprises the ultrasound source 302 and cavity 303. The cavity 303 is bounded by the membrane 304 at a first end 306, by a second end wall 309 at a second end 307, and by a side wall 308. The cavity 303 is formed by bonding the second end wall 309 to the side wall 308 and is capable of supporting a standing wave as described hereinbefore. The direction R of ultrasound emission is away from the membrane 304 from the side of the membrane 304 which is furthest from the second end wall 309. The membrane 304 is supported at its edges by a second side wall 310 which extends in a direction away from the membrane 304 in the z-direction and on the side of the membrane 304 which is furthest from the second end wall 309. The second side wall 310 and the membrane 304 form boundaries for an open cavity 313, the open cavity 313 being closed by the membrane 304 at a first end 314 and being open at a second end 315 opposite the first end 314 in the z direction. By providing the second side wall 310 and by providing the cavity 303 by bonding the second end wall 309 over the membrane 304 and means 305, the membrane 304 and means 305, which may comprise fragile components, can be protected from damage. Furthermore, such a configuration allows for greater freedom in choosing the cavity dimensions during fabrication.

Figure 16B:
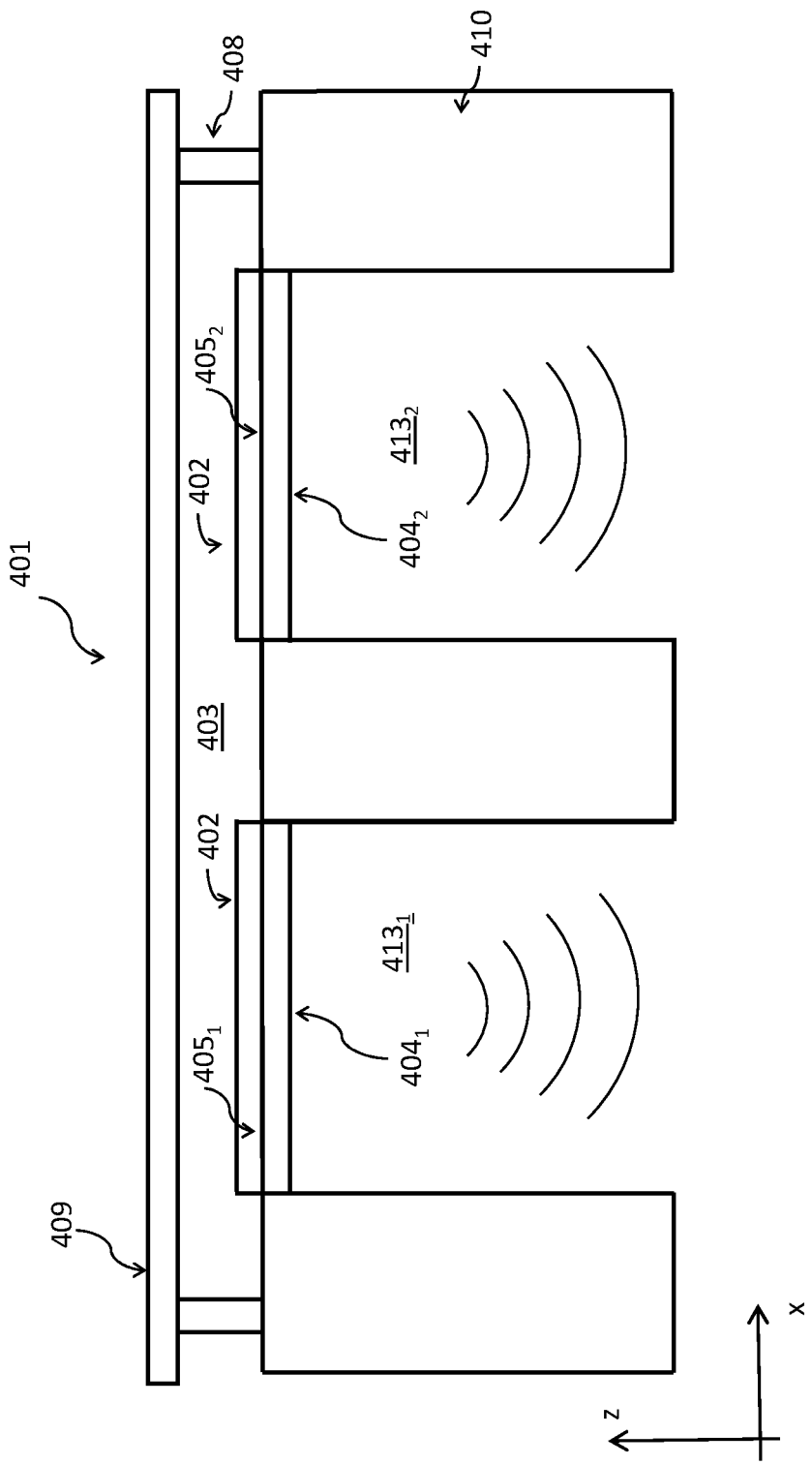
FIG. 16b is a schematic cross-sectional side view of an array of alternative micro-machined ultrasonic transducer according to embodiments of the invention.

Referring to FIG. 16b, in an alternative transducer 401 according to embodiments of the present invention, the at least one membrane 404 comprises two adjacent membranes $404_1$, $404_2$, and corresponding means 4051, 4052 for causing the corresponding membrane to vibrate. The membranes $404_1$, $404_2$ are capable of emitting ultrasound waves into the same cavity 403. The membranes $404_1$, $404_2$ are adjacent to each other in the x-y plane and may have the same or different coordinate in the z direction, that is, the cavity length L may be the same or different at each membrane, and at least two corresponding means for causing a corresponding membrane to vibrate. The cavity 403 is capable of supporting a standing wave which is generated by at least one single membrane or by both membranes $404_1$, $404_2$. The generated standing waves by each membrane are independent from each other and can have different resonance frequencies, which is dependent to the resonance frequency of the corresponding membrane. The side wall 410 of the alternative transducer 401 provides first and second open cavities $413_1$, $413_2$ which help to protect the ultrasound source 402 from damage as described hereinbefore.

In some embodiments, three or more membranes which provide ultrasound waves into the same cavity may be comprised in a transducer. The plurality of membranes may be arranged, for example, in an array configuration.

Although in FIG. 16b the multiple membrane configuration is shown in a transducer arrangement which includes an open cavity, embodiments of the present invention include a multiple membrane configuration without also providing the open cavity, for example an arrangement similar to that shown in FIG. 16a wherein multiple membranes and means are provided for the same cavity.

Embodiments of the present invention provide an array made up of a plurality of transducers as described hereinbefore. Such an array may be a one-dimensional array (i.e. a line) of transducers, which is suitable for obtaining a two-dimensional ultrasound image. Such an array may be two-dimensional array of transducers, which is suitable for obtaining a three-dimensional ultrasound image.

Use of an ultrasonic transducer or transducer array as described herein may comprise placing the at least one membrane in contact with a liquid or gel as a transmission medium for ultrasonic waves generated by the transducer or transducer array.

An ultrasonic transducer as described hereinbefore in relation to FIGS. 12a to 14 may be fabricated according to the following method. First, a substrate is provided. Then, the cavity is formed in the front side of the substrate, for example by deep reactive ion etching or wet etching on top side of the substrate. Before or after realizing the cavity, the electrically conductive layers and piezo layer are deposited on the membrane, forming the ultrasound source having a closed cavity.

An ultrasonic transducer as described hereinbefore in relation to FIG. 15 may be fabricated according to the following method. First, a substrate is provided. Then, the cavity is formed in the back side of the substrate, for example by deep reactive ion etching or wet etching on back side of the substrate. Before or after realizing the cavity, the electrically conductive layers and piezo layer are deposited on the membrane on top side of the substrate, forming the ultrasound source. Then, a second layer or wafer or substrate is bonded or attached by means of epoxies on the second end of the cavity forming the closed cavity.

An ultrasonic transducer as described hereinbefore in relation to FIGS. 16a and 16b may be fabricated according to the following method. First, a substrate or wafer is provided. Then, the open cavity/cavities are formed in the back side of the wafer, for example by deep reactive ion etching, which is preferable for silicon or silicon-on-insulator substrates/wafers, or wet etching. Before or after realizing the cavity, the electrically conductive layers and piezo layer are deposited on the membrane on the top side of the membrane, forming the ultrasound source 802. Next, the side wall of the closed cavity is provided on another wafer or substrate, for example by depositing a thick electrically conductive layer, glass layer, and/or silicon layer. Or the cavity and sidewalls can all be formed by bonding a second wafer (substrate) to the first one, while the cavity is already formed in the second substrate, e.g. by wet etching or deep reactive ion etching to a glass or silicon wafer. Finally, the cavity may be closed by bonding the second end wall to the side wall of the cavity or in which the side walls are already formed by etching the second substrate.

Figure 17A:
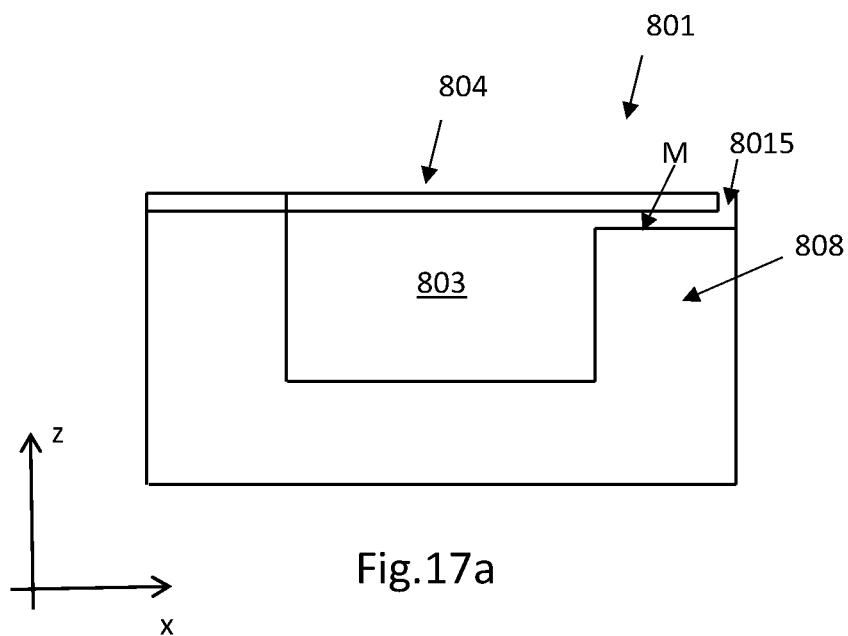
FIG. 17a is an illustrative cross-sectional side view of a method of fabricating a micro-machined ultrasonic transducer according to embodiments of the invention.
Figure 17B:
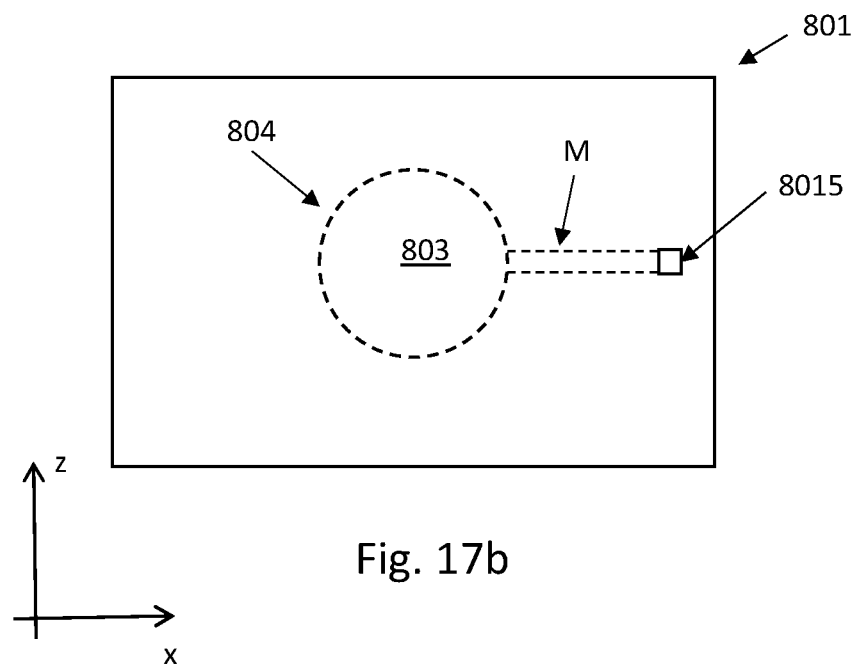
FIG. 17b is an illustrative top view of a method of fabricating a micro-machined ultrasonic transducer according to embodiments of the invention.

Referring to FIG. 17a (cross-sectional side view of transducer) and FIG. 17b (top view of the transducer in FIG. 17a), a method of fabricating a transducer 801 according to embodiments of the present invention comprising a microchannel M in a side wall 808 of the transducer next to the membrane 804 comprises the step of, before providing the membrane 804 on the substrate or wafer, performing an additional etching step to form the microchannel M on the front side of the substrate or wafer, the microchannel M extending outwards 8015 from the cavity. The membrane 804 is then provided by bonding a second wafer to the top of the substrate and optionally thinning the second wafer to an appropriate thickness. Finally, a further etching step is performed in the second wafer to form an opening for the channel.

The cavity 803 may alternatively be provided by an etching process on the backside of the substrate wafer. The cavity 803 is realized by etching through the backside of a SOI wafer. The cavity 803 is etched to a depth such that the remaining layer of wafer at the closed end of the cavity has a thickness suitable for providing a membrane 804. Then the second end of the cavity is sealed by bonding a layer to the second end of the cavity 807. The microchannel is then provided on the front side of the wafer by an etching process.

The cavity 803 can be realized by backside DRIE process on a SOI wafer. Then the cavity 803 should be sealed by a second layer. The micro channel should be realized on the front side of the SOI wafer by a DRIE process through membrane/BOX/and if needed the handle layer of the SOI wafer (BOX is the buried oxide layer and can be removed by another method than DRIE). Then the microchannel M, except the opening 8015, should be sealed by some surface micro-machining techniques.

Figure 18A:
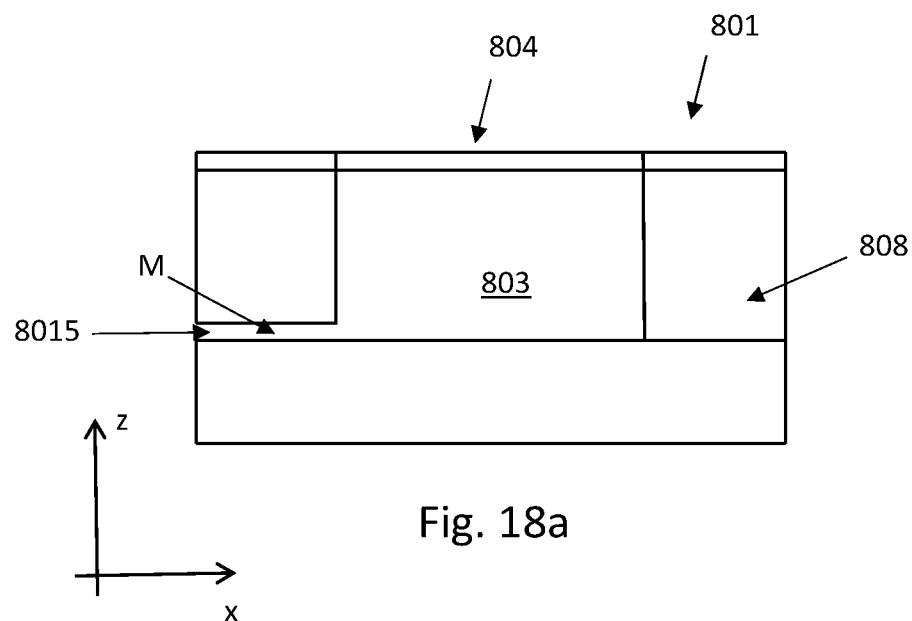
FIG. 18a is an illustrative cross-sectional side view of a method of fabricating a micro-machined ultrasonic transducer according to embodiments of the invention.
Figure 18B:
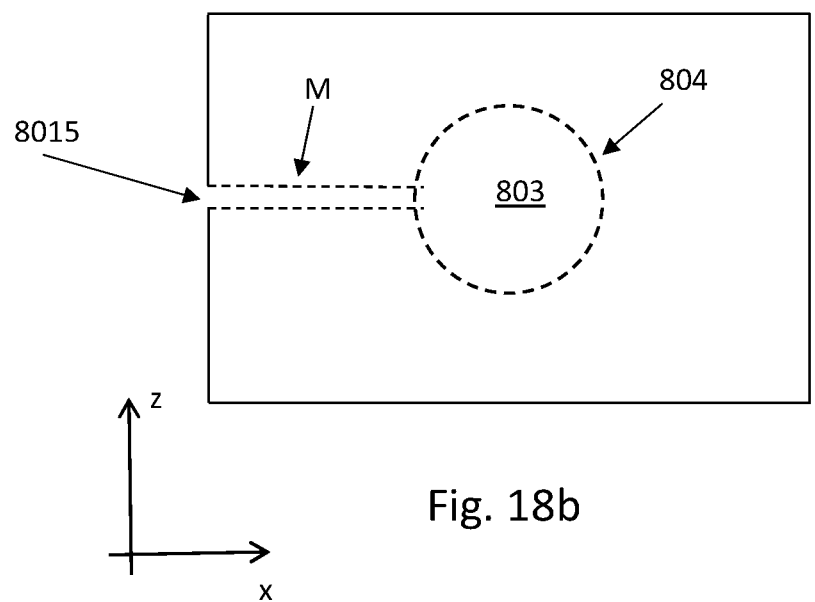
FIG. 18b is an illustrative top view of a method of fabricating a micro-machined ultrasonic transducer according to embodiments of the invention.

Referring to FIG. 18a (cross-sectional view of transducer) and FIG. 18b (top view), a method of fabricating a transducer 801 according to embodiments of the present invention comprising a microchannel M in a side wall 808 of the transducer and away from the membrane 804 in the z direction comprises the steps of providing a wafer; forming the cavity in the backside of the wafer by an etching process; forming the microchannel in the backside of the wafer by an etching process; and closing the second end of the cavity by bonding a layer at the second end of the cavity.

Figure 19A:
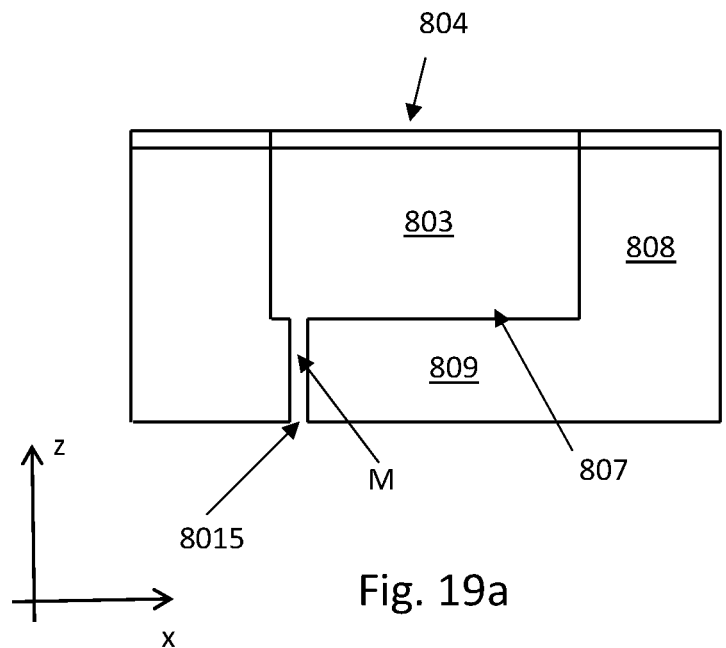
FIG. 19a is an illustrative cross-sectional side view of a method of fabricating a micro-machined ultrasonic transducer according to embodiments of the invention.

Referring to FIG. 19a, a method of fabricating a transducer 801 according to embodiments of the present invention comprising a microchannel M in the second end wall 809 of the transducer may comprise the following steps: first, a wafer is provided; then, the cavity 803 is formed by an etching process on the front side of the wafer; next, a second wafer is bonded to the front side of the wafer for providing the membrane and optionally is thinned to an appropriate thickness. The microchannel M is then formed on the backside of the wafer by an etching process.

Figure 19B:
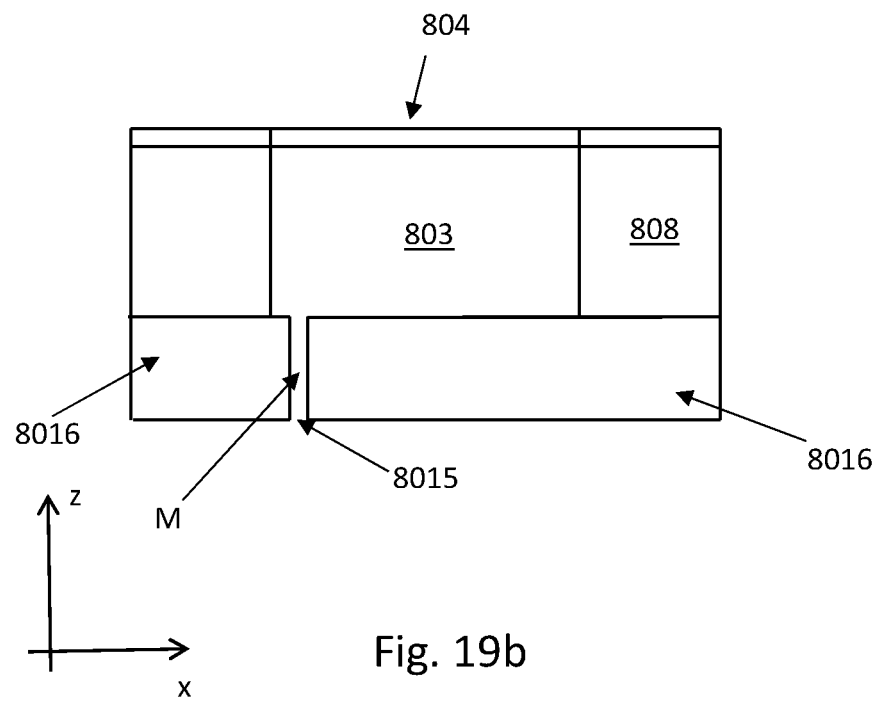
FIG. 19b is an illustrative top view of a method of fabricating a micro-machined ultrasonic transducer according to embodiments of the invention.

Referring to FIG. 19b, an method of fabricating a transducer 801 according to embodiments of the present invention comprising a microchannel M in the second end wall of the transducer may comprise the following steps: first, a wafer is provided; then the cavity is formed by an etching process at the backside of the wafer; next, the second end of the cavity is sealed by bonding or adhering a layer on the backside of the wafer; then, the microchannel is formed in the sealing layer 8016, for example by an etching process e.g. if the sealing layer 16 comprises silicon, or by laser cutting e.g. if the sealing layer comprises e.g. steel or ceramic, or by any other suitable cutting method.

Figure 20A:
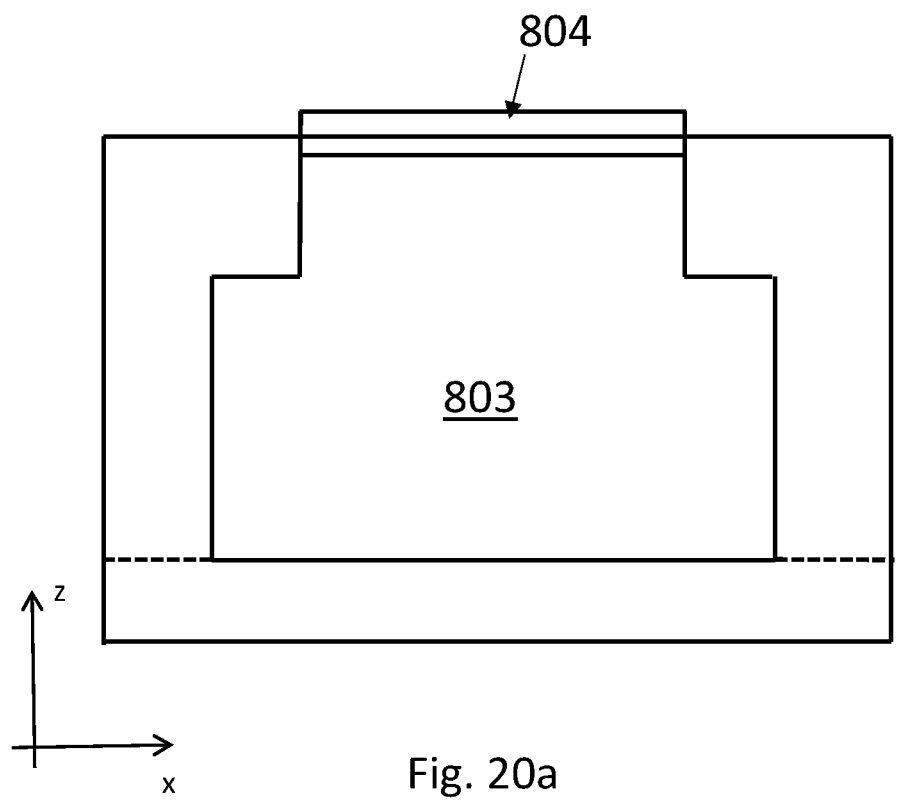
FIGS. 20a and 20b are an illustrative schematic view of a cavity according to embodiments of the present invention.
Figure 20B:
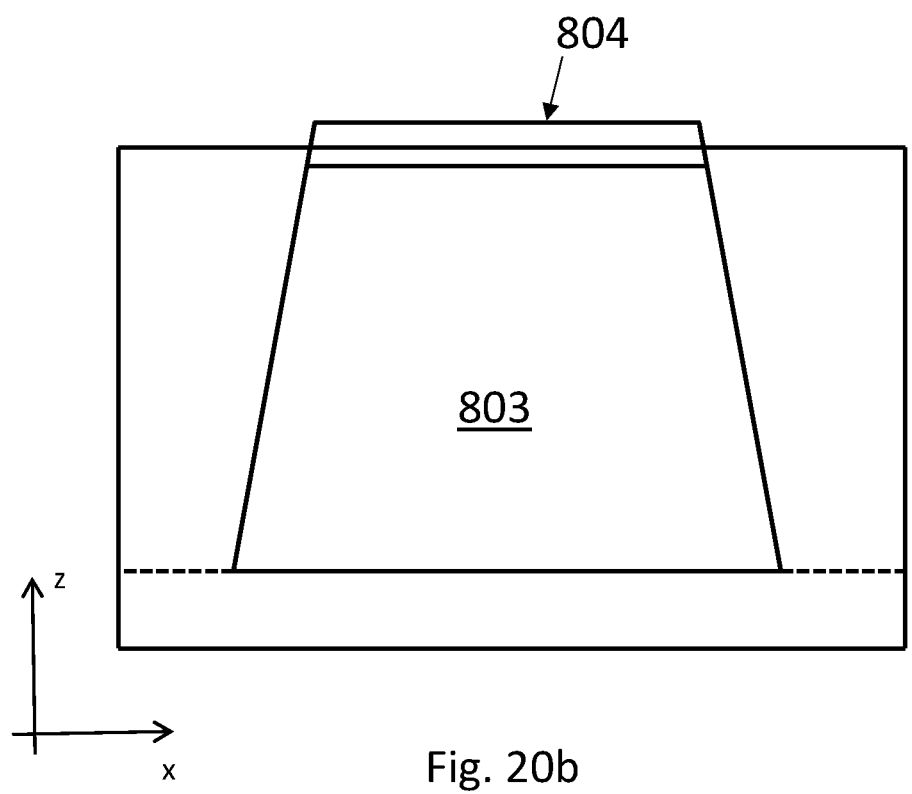

Referring to FIG. 20a and FIG. 20b, there is demonstrated a cavity 803 according to embodiments of the present invention, wherein the cavity 3 has a cross-sectional dimension, measured in the x-y plane, which varies in the z-direction. According to a preferred embodiment of the invention, the cross-sectional dimension of the cavity 803 may not have more than 10% variation in comparison with a reference cross-sectional dimension, wherein the reference cross-sectional dimension corresponds with the cross-sectional dimension, measured in the x-y plane, of the membrane 804. The Dashed lines refer to the fabrication method as FIG. 11*a* or 14, which show that the bottom part can be unified with the whole body or can be connected later as a separate layer.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Steps may be added or deleted to methods described within the scope of the present invention.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An ultrasonic transducer multilayer structure, comprising:
 a semiconductor layer stack defining a diode,
 a micro-machined ultrasonic transducer, MUT, layer stack being electrically in series with said diode and comprising a first electrically conductive layer, said MUT layer stack disposed at least partly on said diode,
 a cavity extending over a region comprising at least a portion of said semiconductor layer stack and said first electrically conductive layer,
 wherein said MUT layer stack comprises a membrane extending at least partly over said region.

2. The ultrasonic transducer multilayer structure according to claim 1, further comprising:
 a first substrate structure for supporting the multilayer structure;
 a first electrically non-conductive layer and a second electrically non-conductive layer being part of the MUT layer stack;
 wherein said cavity is a cMUT closed cavity defined by the first electrically conductive layer, the first electrically non-conductive layer and the second electrically non-conductive layer and
 wherein a first electrode is disposed on at least a portion of the second electrically non-conductive layer within said region; and wherein a second electrode is disposed in a recess of the semiconductor layer stack.

3. The ultrasonic transducer multilayer structure according to claim 1, further comprising:
 a second substrate structure for supporting the multilayer structure;
 a first semiconductor layer of the semiconductor layer stack being weakly doped with a dopant of a first conductivity type;
 a second layer being a semiconductor layer being substrate doped with a dopant of the first conductivity type, at least $10^2$ times less than the dopant concentration of the first semiconductor layer, or an isolation layer;
 a third semiconductor layer of the semiconductor layer stack being heavily doped with a dopant of the first conductivity type;
 wherein said cavity is a pMUT cavity defined by said second substrate structure and said region comprising at least said portion of said semiconductor layer stack and said first electrically conductive layer;
 wherein said MUT layer stack comprises a piezoelectric layer; and
 wherein a first portion of the first electrically conductive layer is sandwiched between the first semiconductor layer and at least a portion of the piezoelectric layer within said region, and
 wherein a second portion of the first electrically conductive layer is disposed on at least a part of the second semiconductor layer such that the first portion and the second portion of the first electrically conductive layer define a first electrically conductive layer gap; and
 wherein the first semiconductor layer is sandwiched between at least a part of the third semiconductor layer and the first portion of the first electrically conductive layer within said region.

4. The ultrasonic transducer multilayer structure according to claim 3, further comprising a fourth semiconductor layer of the semiconductor layer stack being heavily doped with a dopant of a second conductivity type,
 wherein the fourth semiconductor layer is sandwiched between the first semiconductor layer and the first portion of the first electrically conductive layer within said region.

5. The ultrasonic transducer multilayer structure according to claim 3, further comprising a second electrically conductive layer sandwiched outside said region between the second substrate structure and the semiconductor layer stack.

6. The ultrasonic transducer multilayer structure according to claim 3, wherein the cavity is closed.

7. The ultrasonic transducer multilayer structure according to claim 2, wherein the first or second substrate structure includes one or more of a silicon wafer, a silicon-on-insulator, SOI, wafer, a silicon or SOI wafer with integrated circuitry, a semiconductor substrate, and a glass or polymer substrate with or without a thin film transistor, TFT, circuitry.

8. The ultrasonic transducer multilayer structure according to claim 1, further comprising:
 a third substrate structure for supporting the multilayer structure;
 a first semiconductor layer of the semiconductor layer stack being weakly doped with a dopant of a first conductivity type;
 a second layer being an isolation layer;
 a third semiconductor layer of the semiconductor layer stack being heavily doped with a dopant of the first conductivity type;
 wherein said cavity is a pMUT cavity defined by said third substrate structure and said region comprising at least said portion of said semiconductor layer stack and said first electrically conductive layer;

wherein said MUT layer stack comprises a piezoelectric layer and one or more further electrically conductive layers; and wherein a first portion of the first electrically conductive layer is sandwiched between at least a portion of the piezoelectric layer within said region and a mechanical layer being a semiconductor layer being substrate doped with a dopant of the first conductivity type or a further isolation layer, and wherein a second portion of the first electrically conductive layer is disposed on said mechanical layer such that the first portion and the second portion of the first electrically conductive layer define a first electrically conductive layer gap.

9. The ultrasonic transducer multilayer structure according to claim 8, further comprising a fourth semiconductor layer of the semiconductor layer stack being heavily doped with a dopant of a second conductivity type, wherein the fourth semiconductor layer is sandwiched between the first semiconductor layer and the first portion of the first electrically conductive layer within said region.

10. The ultrasonic transducer multilayer structure according to claim 1, wherein the diodes are provided by field-effect transistors.

11. An ultrasonic transducer array device comprising a plurality of ultrasonic transducer multilayer structures as in claim 1.

12. A method of manufacturing an ultrasonic transducer multilayer structure according to claim 1, comprising the steps of:

providing a first wafer according to an array configuration, wherein the first wafer defines a semiconductor layer stack, said semiconductor layer stack defining a diode;

providing a second wafer;

bonding the first wafer to the second wafer, defining a silicon-on-insulator, SOI, wafer wherein the second wafer defines a buried oxide, BOX, layer of the SOI wafer;

processing the first wafer to a predetermined thickness of the ultrasonic transducer multilayer structure;

fabricating a MUT layer stack on the diode, said MUT layer stack comprising a first electrically conductive layer;

creating a cavity extending over a region comprising at least a portion of said semiconductor layer stack and said first electrically conductive layer.

13. Use of an ultrasonic transducer multilayer structure according to claim 1 in a sensor apparatus for measuring at least one characteristic of an object, wherein the sensor apparatus is used for medical imaging, such as cardiac imaging, obstetrics, gynecology, abdominal imaging, intravascular imaging, and mammography, or non-destructive testing, NDA, fingerprint sensors, range finders, gesture recognition, ultrasonic haptic feedback, ultrasonic communication or MEMs speakers.

* * * * *